US011634261B2

(12) United States Patent
Wetsch

(10) Patent No.: US 11,634,261 B2
(45) Date of Patent: Apr. 25, 2023

(54) DEFLATABLE INFLATABLE WEB

(71) Applicant: Pregis Innovative Packaging LLC, Deerfield, IL (US)

(72) Inventor: Thomas D. Wetsch, St. Charles, IL (US)

(73) Assignee: Pregis Innovative Packaging LLC, Chicago, IL (US)

(*) Notice: Subject to any disclaimer, the term of this patent is extended or adjusted under 35 U.S.C. 154(b) by 106 days.

(21) Appl. No.: 17/247,479

(22) Filed: Dec. 11, 2020

(65) Prior Publication Data
US 2021/0179333 A1    Jun. 17, 2021

Related U.S. Application Data

(60) Provisional application No. 62/946,826, filed on Dec. 11, 2019.

(51) Int. Cl.
- *B65D 81/05* (2006.01)
- *B31D 5/00* (2017.01)
- *B65D 65/40* (2006.01)

(52) U.S. Cl.
CPC ......... *B65D 81/052* (2013.01); *B31D 5/0073* (2013.01); *B65D 65/40* (2013.01); *B31D 2205/0047* (2013.01)

(58) Field of Classification Search
CPC .... B65D 81/052; B65D 65/40; B31D 5/0073; B31D 2205/0047
USPC ........................................................ 206/522
See application file for complete search history.

(56) References Cited

U.S. PATENT DOCUMENTS

| 3,642,550 | A  | 2/1972  | Doll |
| 6,410,119 | B1 | 6/2002  | De Luca et al. |
| 7,807,253 | B2 | 10/2010 | Kannankeril |
| 7,926,507 | B2 | 4/2011  | Wetsch et al. |
| 8,061,110 | B2 | 11/2011 | Wetsch |
| 8,128,770 | B2 | 3/2012  | Wetsch et al. |

(Continued)

FOREIGN PATENT DOCUMENTS

WO    2019140065 A1    7/2019

OTHER PUBLICATIONS

International Search Report and Written Opinion for International Application No. PCT/US2020/070904, filed Dec. 11, 2020, dated Mar. 11, 2021.

*Primary Examiner* — Jacob K Ackun
(74) *Attorney, Agent, or Firm* — Fox Rothschild LLP

(57) ABSTRACT

A protective packaging web is disclosed. The web includes a flexible inflatable web that includes inflatable chambers having inlets and configured for receiving a fluid from the inlets and sealing the fluid therein, the inflatable chambers being configured such that, when inflated, the inflatable web structure has a first contoured exterior surface including a plurality of peaks and valleys, and a flexible first outer ply affixed to the peaks and detached from the valleys of the first contoured surface, such that when the inflatable chambers are inflated, the first outer ply extends along a phantom first tangential surface, bridging the valleys of the first contoured surface, such that when the chambers are inflated the affixed first outer ply and the inflatable web cooperatively form a framed structure having significantly elevated bending stiffness compared to a bending stiffness resulting from the inflatable web structure absent the attached first outer ply.

24 Claims, 26 Drawing Sheets

(56) References Cited

U.S. PATENT DOCUMENTS

| | | | | |
|---|---|---|---|---|
| 9,615,642 B2* | 4/2017 | Bergh | .................... | A45C 13/02 |
| 10,870,535 B2* | 12/2020 | Olness | ...................... | B65F 1/14 |
| 10,926,935 B2* | 2/2021 | Martin | .................... | B65B 55/20 |
| 2004/0000581 A1 | 1/2004 | Brandolini et al. | | |
| 2010/0282824 A1 | 11/2010 | Kannankeril et al. | | |
| 2011/0172072 A1 | 7/2011 | Wetsch et al. | | |
| 2014/0261752 A1 | 9/2014 | Wetsch | | |
| 2015/0314940 A1* | 11/2015 | Matta | .................... | B65D 75/58 |
| | | | | 206/522 |
| 2019/0225406 A1 | 7/2019 | Kim | | |

* cited by examiner

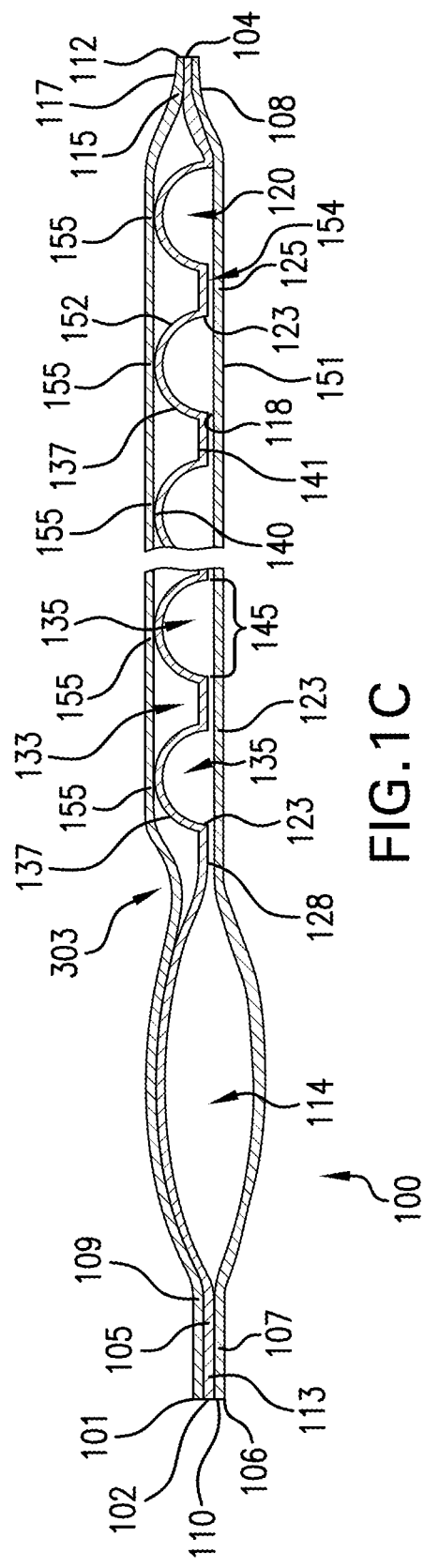
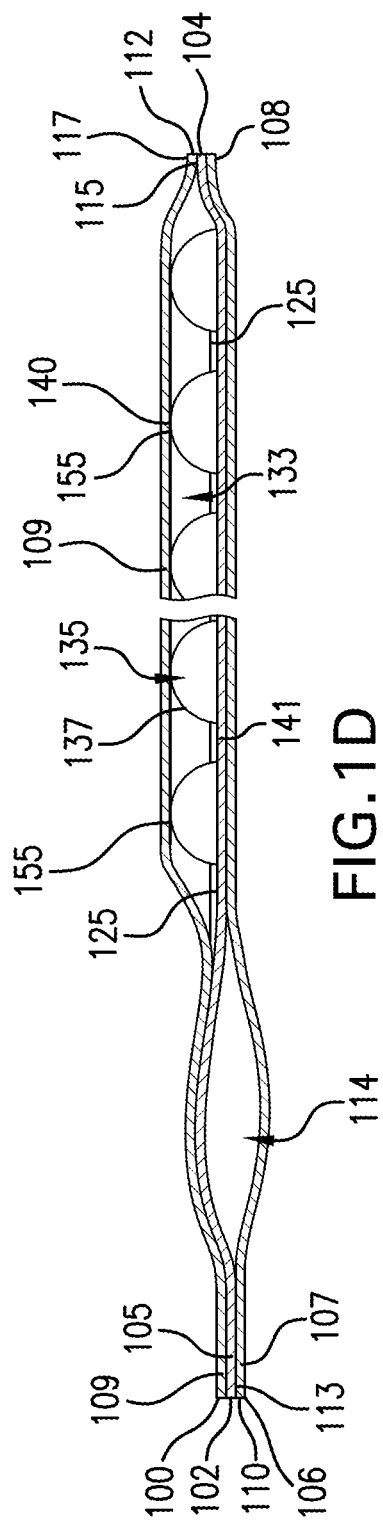

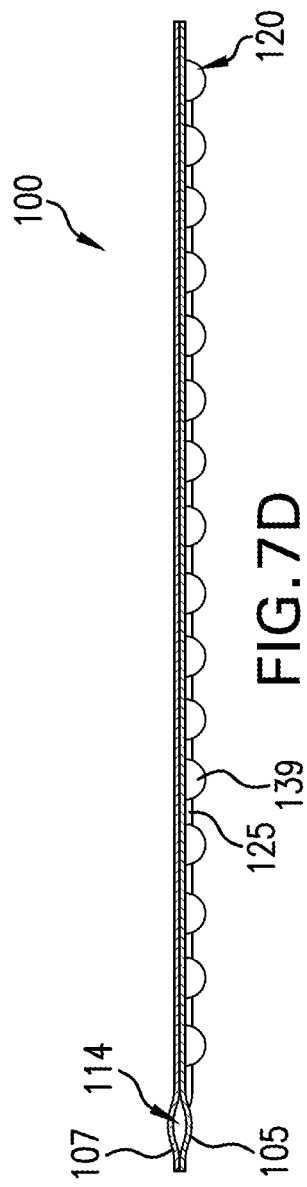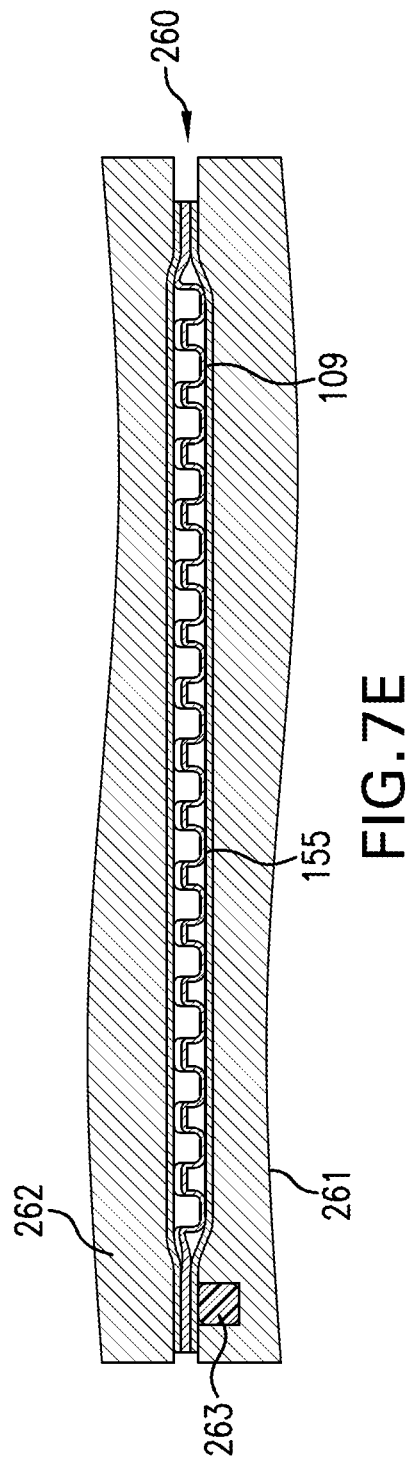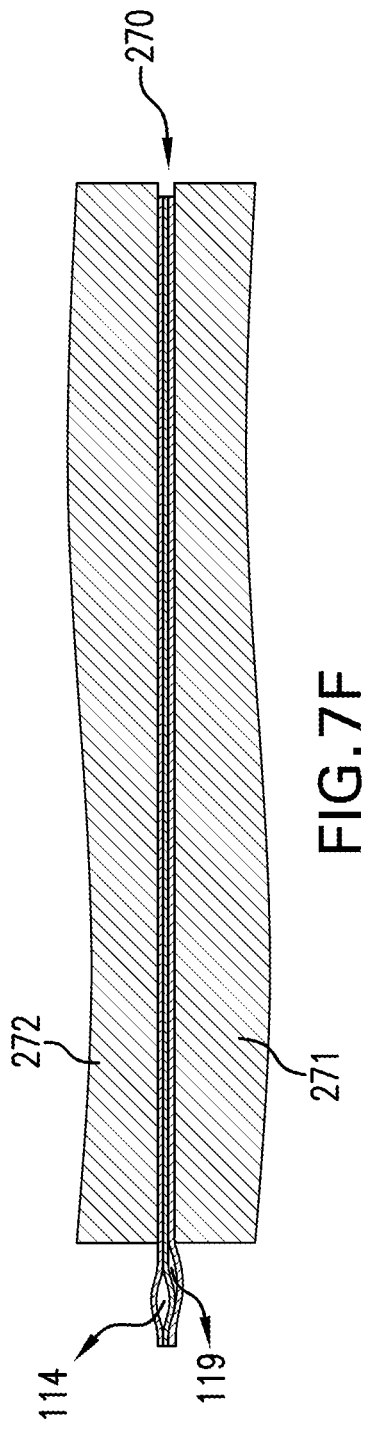

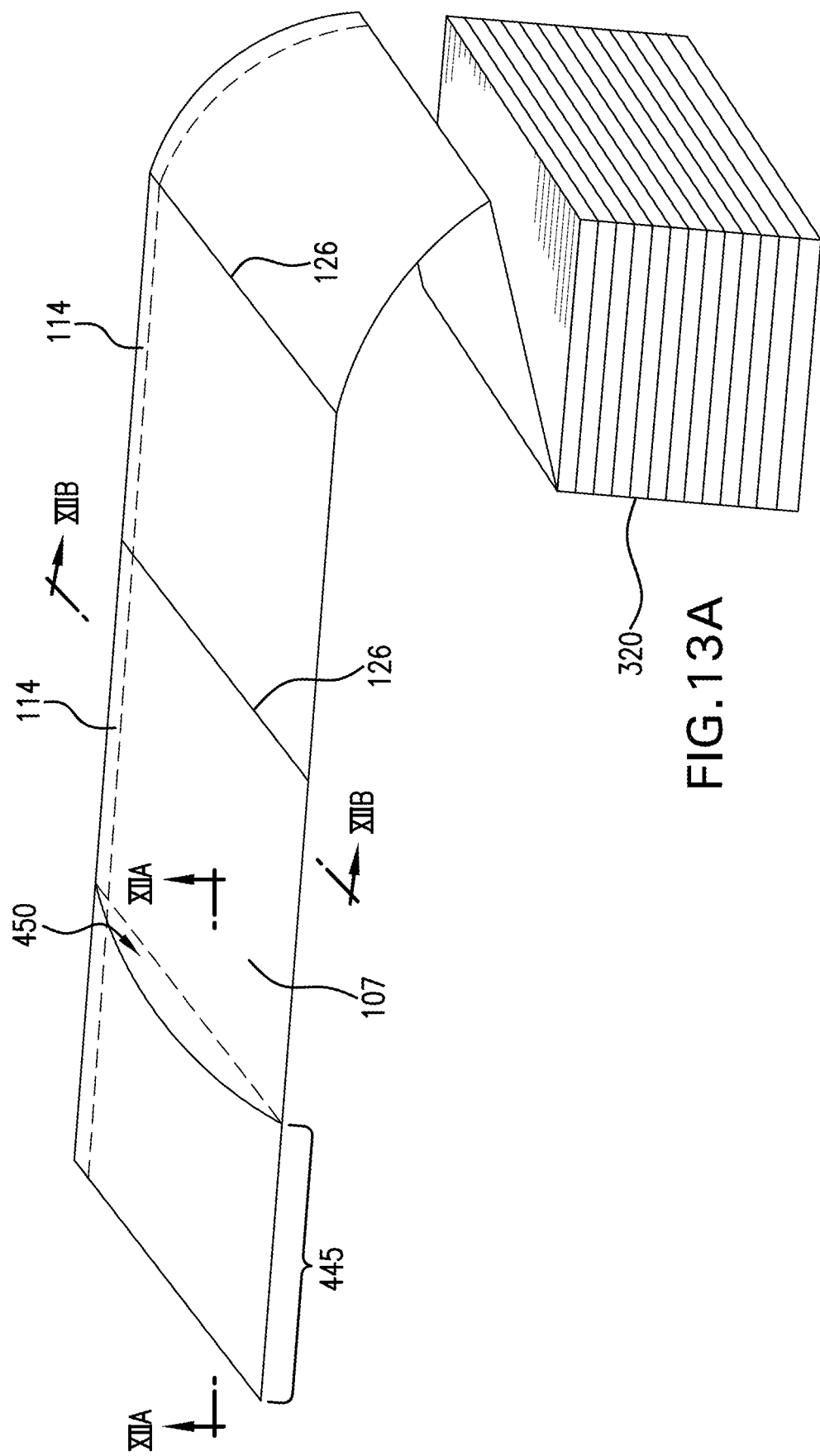

DEFLATABLE INFLATABLE WEB

CROSS-REFERENCE TO RELATED APPLICATIONS

This application claims priority to U.S. Provisional Application No. 62/946,826, filed Dec. 11, 2019, the disclosure of which is incorporated herein by reference in its entirety.

FIELD OF THE INVENTION

The present invention relates generally to inflatable cushioning material for packaging and shipping and, more specifically, to packaging having plastically deformed chambers that are inflatable after formation of the material.

BACKGROUND

A traditional type of protective packaging is known as bubble wrap. Bubble wrap is made with a flexible plastic film in which caps are vacuum formed. This film is sealed to another, flat, flexible plastic film around the perimeters of the caps to isolate and seal the cavity formed by the caps, trapping air therein, and providing a low density, protective packaging sheet. Some bubble wrap is produced by sealing flat, flexible plastic film onto the caps on the opposite side of the other flat film, and is often referred to as "third web bubble" and used for making padded envelopes, for example. Bubble wrap, however, once manufactured, must also be transported to sites in its bulky, low-density configuration, making it volumetrically inefficient to transport to the packaging sites.

SUMMARY

According to an aspect of the present disclosure, a protective packaging web is provided. The web includes a flexible inflatable web that includes inflatable chambers having inlets and configured for receiving a fluid from the inlets and sealing the fluid therein, the inflatable chambers being configured such that, when inflated, the inflatable web structure has a first contoured exterior surface including a plurality of peaks and valleys, with the peaks defining a phantom first tangential surface connecting the plurality of peaks. The web further includes a flexible first outer ply affixed to the peaks and detached from the valleys of the first contoured surface, such that when the inflatable chambers are inflated, the first outer ply extends along the phantom first tangential surface, bridging the valleys of the first contoured surface, such that when the chambers are inflated the affixed first outer ply and the inflatable web cooperatively form a framed structure having significantly elevated bending stiffness compared to a bending stiffness resulting from the inflatable web structure absent the attached first outer ply.

In certain embodiments, the inflatable web structure can include first and second overlayed chamber plies with a seal pattern therebetween that provides the contoured surface when the inflatable chambers are inflated.

In certain embodiments, the first chamber ply defines the first contoured surface, and the second chamber ply is a second outer ply that cooperates with the first outer ply and first chamber ply to provide the framed structure.

In certain embodiments, the second surface is configured to define a second contoured exterior surface when the inflatable chambers are inflated on an opposite major side of the inflatable web structure from the first contoured surface.

In certain embodiments, the web further includes a flexible second outer ply affixed to the peaks and detached from the valleys of the first contoured surface including a plurality of peaks and valleys, wherein the plurality of peaks of the second contoured surface define a phantom second tangential surface connecting the plurality of peaks, such that when the inflatable chambers are inflated, the second outer ply extends along the phantom second tangential surface, bridging the valleys of the second contoured surface, thereby cooperatively increasing the bending stiffness of the framed structure.

In certain embodiments, a distance along the first contoured surface between the peaks thereof to which the first outer ply is affixed is greater than a distance along the first outer ply between the peaks to which the first outer ply is affixed.

In certain embodiments, the protective packaging web with the inflatable chambers inflated has a plank configuration that is naturally biased to retain a flat configuration with the first and second outer plies extending generally flat.

In certain embodiments, the peaks include a multitude of peaks arranged in a 2D pattern over the first contoured surface.

In certain embodiments, the inflatable chambers include a plurality of protruding structures, each of the plurality of protruding structures including a base perimeter enclosing an open base region and an extended surface protruding from a plane defined by the flexible inflatable web in a generally flat state, the protruding structures having a larger surface area than the open base region, forming a series of cavities, and each of the plurality of protruding structures includes an inflation port allowing each of the plurality of cavities to be inflated via the inflation port.

In certain embodiments, the surface of the protruding structures is formed at least in part by a plastically stretched portion of the flexible inflatable web.

In certain embodiments, each of the inflatable chambers extends along the flexible inflatable web at a non-perpendicular angle to a longitudinal edge of the flexible inflatable web.

In certain embodiments, the flexible inflatable web and the flexible first outer ply form secondary inflatable chambers therebetween having inlets and configured to receiving a fluid from the inlet and sealing the fluid therein.

In certain embodiments, the web further includes one or more venting components between the flexible inflatable web and the flexible first outer ply configured to enable fluid to be removed from the one or more secondary inflatable chambers.

In certain embodiments, the flexible first outer ply extends along a length of the flexible inflatable web.

In certain embodiments, the web further includes a channel connecting to the inlet, the channel forming a fluid path formed within the flexible inflatable web, wherein the inlet allows fluid to flow out of the inflatable chambers and back into the inflatable chambers such that the inflatable chambers can be collapsed to a substantially uninflated state and subsequently returned to an inflated state.

In certain embodiments, the inflatable chambers are configured to receive a longitudinal seal adjacent thereto such that the longitudinal seal closes off the inlets, preventing the inflatable chambers from being inflated or deflated.

In certain embodiments, the flexible first outer ply is configured to be affixed to the flexible inflatable web via heat seals.

In certain embodiments, the web further includes a heat resistive material affixed to one or more of the flexible first outer ply and the flexible inflatable web, wherein the heat resistive material prevents the first outer ply to be heat sealed to the flexible inflatable web at locations at which the heat resistive material is positioned between the flexible first outer ply and the flexible inflatable web.

According to another aspect of the present disclosure, a method for forming an inflatable web is provided. The method includes providing a flexible inflatable web that includes inflatable chambers having inlets and configured for receiving a fluid from the inlet and sealing the fluid therein, the inflatable chambers being inflated, and the inflatable web structure having a first contoured exterior surface including a plurality of peaks and valleys, with the peaks defining a phantom first tangential surface connecting the plurality of peaks, and affixing a flexible first outer ply to the peaks of the first contoured surface while the inflatable chambers are inflated and the inlets are yet unsealed, such that the first outer ply is detached from the valleys and the first outer ply extends along the phantom first tangential surface, bridging the valleys of the first contoured surface, such that when the chambers are inflated the affixed first outer ply and the inflatable web cooperatively form a framed structure having significantly elevated bending stiffness compared to a bending stiffness resulting from the inflatable web structure absent the attached first outer ply.

In certain embodiments, the method further includes holding the inlets at least partially closed to retain the fluid in the inflated chambers, wherein the first flexible ply is affixed to the peaks while the inlets are held closed.

In certain embodiments, the inlets are held closed by pinching.

In certain embodiments, the flexible outer ply is affixed to the peaks by heat sealing.

In certain embodiments, the method further includes applying a heat resistive material to one or more of the flexible first outer ply and the flexible inflatable web, wherein the heat resistive material prevents the first outer ply to be heat sealed to the flexible inflatable web at locations at which the heat resistive material is positioned between the flexible first outer ply and the flexible inflatable web.

In certain embodiments, the contoured surface is formed at least in part by a plastically stretched portion of the first film ply.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 1C is a cross-section of the inflatable web of FIG. 1B with the web having a base ply, a formed ply, and a tertiary ply;

FIG. 1D is a cross-section of the inflatable web of FIG. 1B with the web having a base ply, a formed ply, and a tertiary ply;

FIG. 7D is a cross-section of the inflatable web moving through the web forming apparatus of FIG. 7A along cross section line C-C;

FIG. 7E is a cross-section of an attachment element from the web forming apparatus of FIG. 7A along cross section line D-D;

FIG. 7F is a cross-section of a deflation element from the web forming apparatus of FIG. 7A along cross section line E-E;

FIG. 13A illustrates a series of packaging bags in a fanfold configuration;

Figure 1A:
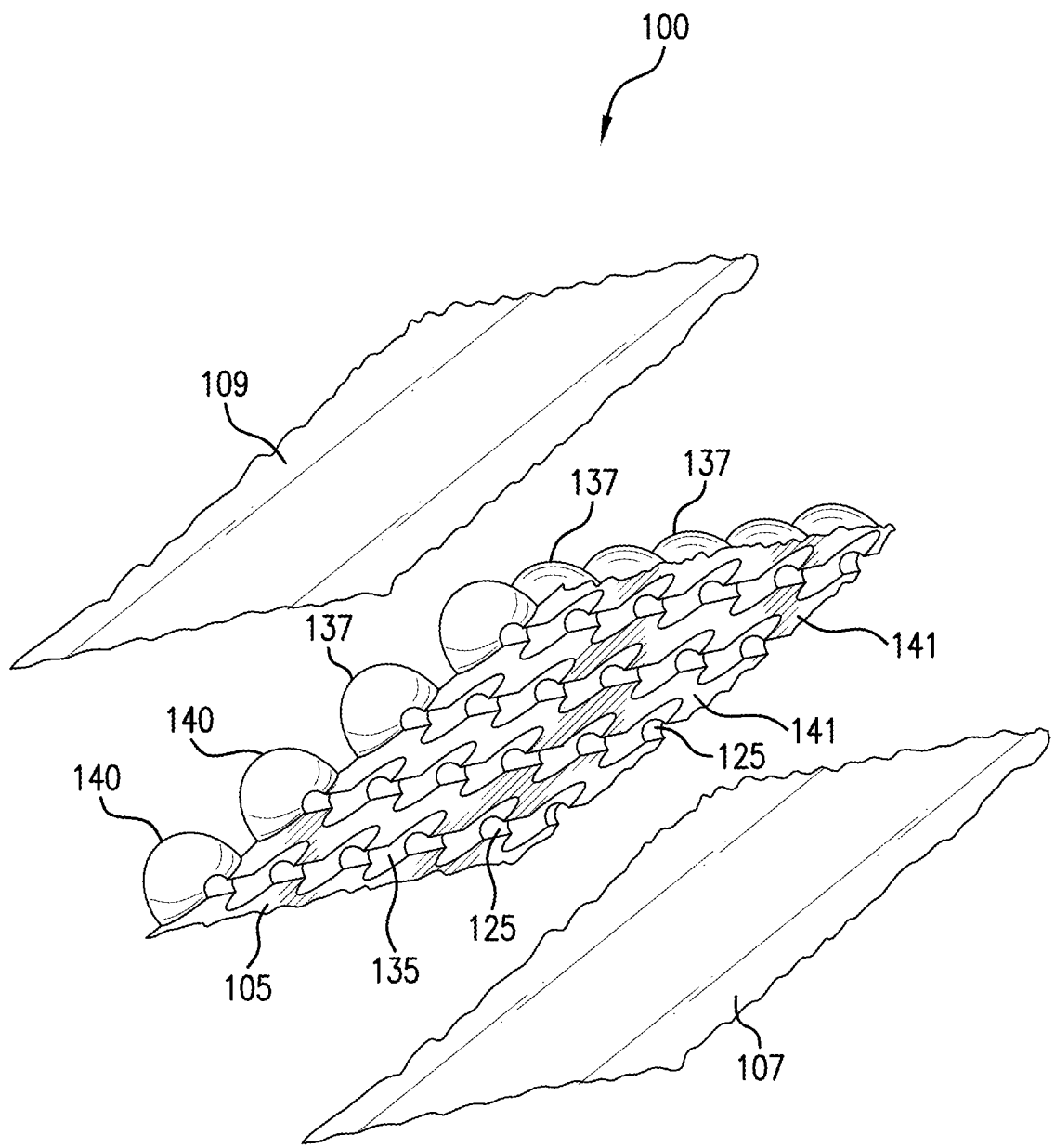
FIG. 1A is a bottom perspective view of plies used to form an inflatable web with inflatable sub-chambers in accordance with an embodiment.

Each of the above referenced figures is arranged in accordance with at least some embodiments of the present disclosure.

DETAILED DESCRIPTION

The present disclosure is directed to flexible structures that can be inflated and used as cushioning or protection for packaging and shipping. In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples can be utilized and other changes can be made without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are implicitly contemplated herein.

Some aspects of the present disclosure are directed to packaging elements formed from packaging material. Some packaging elements formed from packaging material include pads and sheets, which include a single wall. Some packaging elements formed from the packaging material include packaging containers, which include a plurality of walls enclosing an interior cavity for storing one or more products. Some packaging containers include bags and envelopes, such as mailers, which may be fabricated and then filled with an item to be shipped at a later point in time.

Some embodiments of the present disclosure include expansion walls. Some expansion walls include expandable walls, which are in an unexpanded configuration and can be expanded at a later time. Some expansion walls include expanded walls, which are already in an expanded configuration. Expansion walls may include one or more inflation chambers. Some inflation chambers include inflatable chambers configured to receive a fluid such as, for example, air or other suitable gaseous or non-gaseous fluids. Some inflation chambers include inflated fluid-chambers. Inflated fluid-chambers may include, for example, preformed chambers (e.g., vacuformed bubbles).

The various seals described herein include a bonding material. The bonding material includes a sticking element. The sticking element includes an adhesive or cohesive material to provide an adhesive or cohesive surface, respectively. A combination of adhesive and cohesive surfaces can be used. The sticking element can be applied directly to the exposed surface of the material by suitable known methods, or it can be applied on a tape, such as a double-sided tape, or other suitable methods. In some embodiments, the bonding material includes polyethylene.

As used herein, an adhesive sticking element is made of a material that adheres to other types of surfaces, preferably such as ones that would be typically be found in the vicinity of protective packaging, such as to plastic, paper, or metals. The adhesive can stick to an opposing surface without relying on the opposing surface having the same or a complimentary material for the stickage to take place to form a connection between the two surfaces. Examples of suitable adhesives include liquid adhesives and pressure sensitive adhesives. Pressure sensitive adhesives can be selected that stich after applying a slight, initial, external pressure to create the bond. Examples of these include water-based, acrylic, pressure sensitive adhesives, similar to what is applied to packaging tape, which material holds two surfaces together solely by surface contact, often upon a slight initial external pressure. Examples may include dry adhesives, which typically require no activation with water, solvent or heat, and firmly adhere to many dissimilar surfaces. Pressure sensitive adhesives can be selected that are aggressive and/or permanently tacky at room temperature. Pressure sensitive adhesive application and use can be automated. When used in assembly, pressure sensitive adhesives that do not require setup or long curing times can be used to save time compared to using typical liquid adhesives. Adhesion is preferably immediate with pressure sensitive adhesives, allowing manufacturing procedures to continue uninterrupted, which can result in significant time and labor savings.

A cohesive material of a sticking element causes one surface to stick to an opposing surface by coming into contact with the same or a complimentary cohesive substance to form the bond between the two surfaces. Cohesives, in which opposing cohesives stick to one another, do not stick to other substances sufficiently to adhere to those other substances (e.g., other surfaces of the protective packaging material that do not have a cohesive element, surfaces of the container, surfaces of the product to be shipped, etc.), or in some cases would stick very weakly compared to the bond they form from sticking to each other. A cohesive can be a pressure sensitive cohesive, in which pressure is required to activate the bond. Examples of a suitable cohesive material from which the cohesive sticking elements can be made include natural and synthetic latex-based cohesives. The cohesive material in some embodiments is applied as a liquid to the appropriate portion of the protective packaging material, and in others is applied in other known forms. Some types of cohesives, such as ones made with latex, is mixed with water without additional adhesives to bond to the respective, non-cohesive, portion of the protective packaging material, and upon drying remains stuck to the exposed surface of the protective packaging material to which is has been applied. In some embodiments, the cohesive material can be mixed with an adhesive, often applied as a liquid, onto the protective packaging material. The adhesive can be selected so that after applying the cohesive and adhesive mixture onto the protective packaging material (e.g., onto a film ply), the adhesive evaporates, leaving the cohesive bonded to the non-cohesive protective packaging material (e.g., onto a film or paper ply). One method of liquid application is spraying, although brushing or other suitable methods can be used. Also, other suitable methods of applying the cohesive to the non-cohesive material surface can alternatively be used.

Figure 1B:
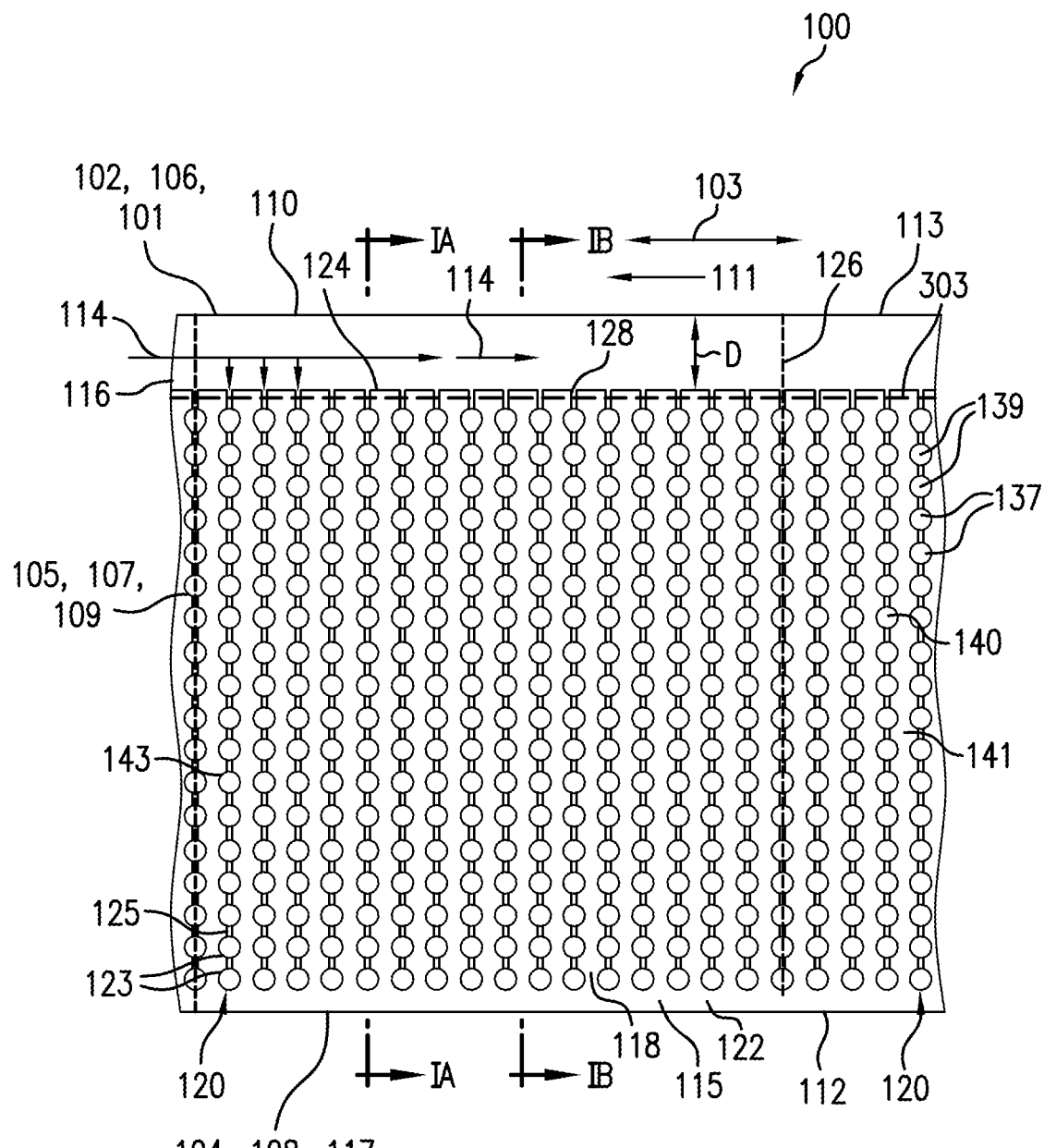
FIG. 1B is a top view an inflatable web of FIG. 1A with inflatable sub-chambers.

Referring to FIGS. 1A-D, a flexible structure, such as a multi-ply inflatable web or protective packaging web 100 of film for inflatable protective packaging, is provided. The inflatable web 100 includes a formed web film layer, or ply, 105. The inflatable web 100 also includes a first longitudinal edge 102 and a second longitudinal edge 104. The inflatable web 100 includes a base web film layer, or ply, 107, having a first longitudinal edge 106 and a second longitudinal edge 108. The longitudinal edges 102, 104, 106, 108 run in a longitudinal direction 103 of the inflatable web 100. The longitudinal direction of the web can be the direction that the web 100 is advanced into a processing machine. The longitudinal direction 103 can also be the direction that the web 100 is fed into a processing machine, or the direction that the finished structure is rolled onto a storage roll after processing. A longitudinal direction 103 can be longitudinally upstream or longitudinally downstream. A longitudinally upstream direction 103 is a longitudinal direction opposed to a direction of movement of the web 100 through a processing machine. A longitudinally downstream direction 111 is a direction that is substantially the same as a direction of the web 100 through a processing machine. Generally, a longitudinal direction 103 corresponds to the longest dimension of the web film layers, or plies, 105,107. The base ply 107 is aligned to be overlapping and can be generally coextensive with the formed ply 105 (as shown in FIG. 1B), i.e., at least respective first longitudinal edges 102, 106 are aligned with each other and/or second longitudinal edges 104, 108 are aligned with each other. According to various embodiments, the formed ply 105 and the base ply 107 form a flexible inflatable web 154 having one or more chambers configured to be filled with fluid. The flexible inflatable web 154 includes a first side 151 and a second side 152. According to some embodiments, the inflatable structure does not include the base ply 107 and the base ply 107 is adhered to the flexible inflatable web 154.

In some embodiments, the layers, or plies, 105, 107, can be partially overlapping with inflatable areas in the region of overlap. The plies 105, 107 can be joined to define a first longitudinal edge 110 and a second longitudinal edge 112 of the web 100. This can be done with separate sheets or by folding over a single sheet. A longitudinal seal 113 can be formed at the first longitudinal edge 110, and a longitudinal seal 115 can be formed at the second longitudinal edge 112. For example, the first longitudinal edges 102, 106 can be coupled together to form the first longitudinal edge 110 of the web 100, and the second longitudinal edges 104, 108 can be coupled together to form the second longitudinal edge 112 of the web 100. The coupling of the respective edges forms an airtight seal at the first and second longitudinal edges 110, 112 of the web 100.

Figure 5A:
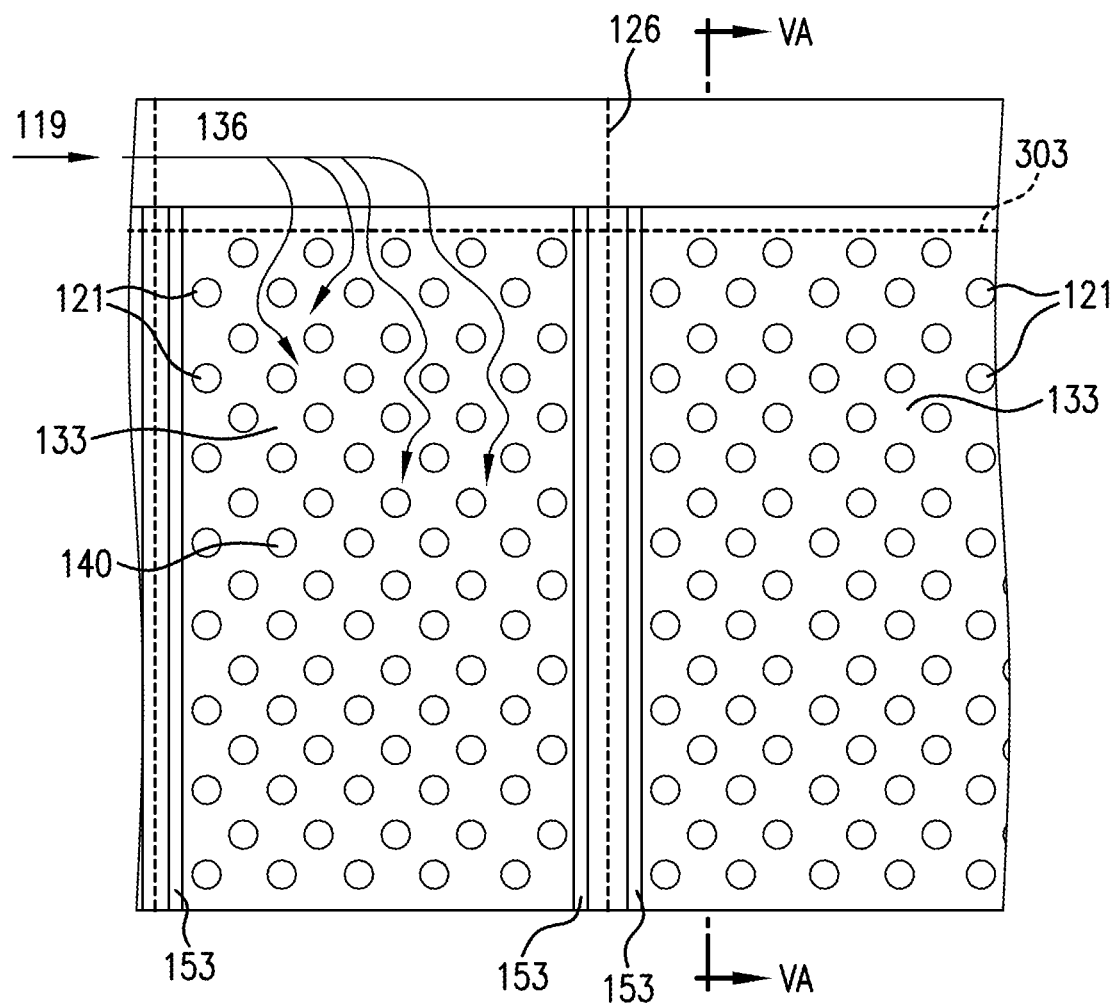
FIG. 5A is an example of an inflatable web having protruding structures with a surrounding cavity.
Figure 5B:
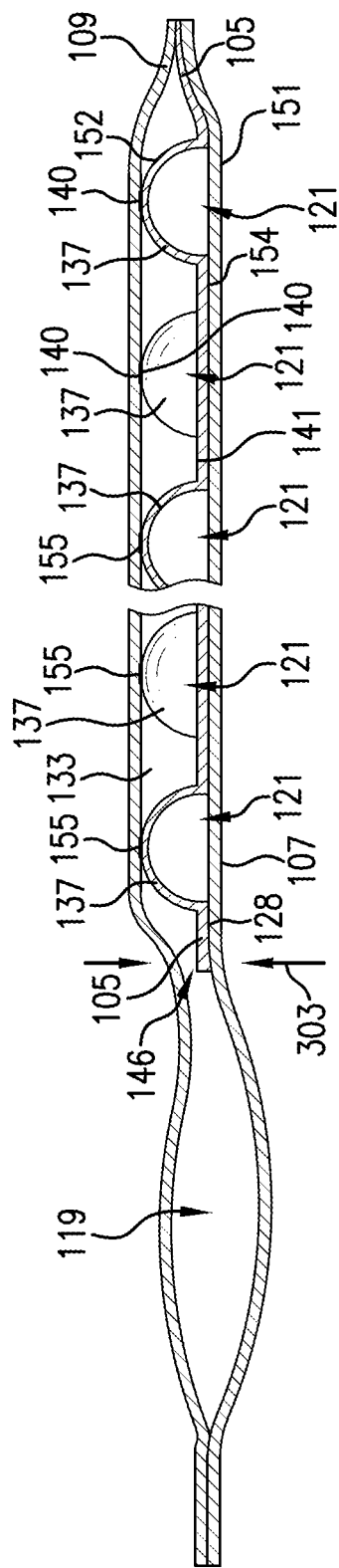
FIG. 5B is a cross-section of the inflatable web of FIG. 5A.

In some embodiments, a tertiary film or tertiary ply, 109 can be sealed to the formed ply 105, thereby sandwiching the formed ply 105 between the base ply 107 and the tertiary ply 109, as illustrated in FIG. 1C (see also FIGS. 5A and 5B). This can provide added rigidity to the structure of the web 100. The tertiary ply 109 includes a first longitudinal edge 101 and a second longitudinal edge 117. The first longitudinal edges 102, 106, and 101 can be coupled together to form the first longitudinal edge 110 of the web 100, and the second longitudinal edges 104, 108, and 117 can be coupled together to form the second longitudinal edge 112 of the web 100. The coupling of the respective edges forms an airtight seal at the first longitudinal edge 110 and the second longitudinal edge 112 of the web 100. Although, in some embodiments, the first longitudinal edge 110 is not necessarily closed, but can remain open to form an inflation region 114, allowing fluid to be injected from the side. However, in other embodiments, the first longitudinal edge 110 is closed, forming a closed inflation region 114, such as a channel in which a nozzle is inserted.

The web 100 can be formed from any of a variety of web materials known to persons of ordinary skill in the art. Such web materials may include, for example, ethylene vinyl acetates (EVAs), metallocenes, polyethylene resins such as low-density polyethylene (LDPE), linear low-density polyethylene (LLDPE), high-density polyethylene (HDPE), and blends thereof. Other materials and constructions can be used. The web 100 can be rolled on a hollow tube, a solid core, folded in a fan-folded box, or in another desired form for storage and shipment.

The various plies (e.g. 105, 107, and/or 109) can be connected via various seals across the expanse thereof. The seals can merely connect the film plies or the seals can further define or allow features to function. For example, plies 105,107 can be connected together by seals 118. Additionally or alternatively, in accordance with various embodiments, one or more fluid holding cavities 120 are defined within a boundary formed by seals 118. The seals 118 can seal the plies 105,107 together with one or more regions remaining unsealed, such as the fluid holding cavities 120. In some embodiments, the unsealed portions can include inflation channels 125, inflation regions 114, and an inflation channel port 128 between the inflation channels 125 and the inflation region 114. The seals 118 can extend from the first longitudinal edge 110 to the second longitudinal edge 112, defining the various fluid-holding cavities 120 between the film plies. In some embodiments, such as shown in FIG. 1B, the seals 118 have a generally transverse orientation. As shown in FIG. 1B, the web 100 includes a series of transverse seals 118 disposed along the longitudinal extent of the web 100 in a transverse direction. A transverse direction is a direction extending at an angle to a longitudinal direction of the web 100. In some embodiments, the transverse direction is substantially perpendicular to the longitudinal direction. However, in other embodiments, a transverse direction can be at a non-perpendicular angle to the longitudinal direction at more than zero degrees and less than 90 degrees. In some embodiments, the seals 118 can be contiguous with the seals 122 that connect the edges 112. In some embodiments, the seals 118 can be contiguous with the seals 124 that define the inflation region 114. The second end 124 of seals 118 can be spaced a transverse dimension D from the first longitudinal edge 110. The distance between the first end 122 and the second end 124 defines the transverse width of the transverse seal 118.

Each transverse seal 118 embodied in FIG. 1B is substantially straight and extends substantially perpendicular to the second longitudinal edge 112 (e.g., transversely across the film 100). It is appreciated, however, that other arrangements of the transverse seals 118 are also possible. It is contemplated that the transverse seal 118 can be sealed along the entirety of its area; however, it is also contemplated that the transverse seal can be sealed around a periphery with its middle portion unsealed, forming a pocket in its middle portion. It is also contemplated that the transverse seals 118 can be sealed with a longitudinal seal 113 proximate to the second ends 124. In other embodiments, a pair of substantially linear seals 118 can be disposed on either side of a separation region 126, such as shown in FIG. 5A.

The transverse seals 118, as well as the sealed longitudinal edges 110, 112 (which in some embodiments can be the same continuous seal), can be formed from any of a variety of techniques known to those of ordinary skill in the art. Such techniques include, but are not limited to, adhesion, friction, welding, fusion, heat sealing, laser sealing, and ultrasonic welding. The inflatable web 100 can include fluid-holding cavities 120. The fluid-holding cavities 120 can be inflatable and deflatable in various embodiments, (e.g., FIGS. 1A-6). In other embodiments, the fluid-holding cavities 120 can be filled with fluid upon inflation without a mechanism to deflate the fluid-holding cavity 120, aside from destroying the fluid-holding cavity 120. In some embodiments, the fluid-holding cavities 120 can be inflatable/deflatable cavities 135 having an inflation port 123. In some embodiments, the fluid-holding cavities 120 can be large cavities extending across and/or around a number of features, such as cavities 133. In some embodiments, the fluid-holding cavities 120 can be fully isolated cavities 121 that are filled with fluid upon formation with no deflation mechanism. These various cavities can be used separately to form inflatable webs or can be used in any suitable combination to form the webs. Some of these various embodiments are discussed in more detail below. In accordance with various embodiments, the various cavities contain a fluid, causing the respective web film layers defining the cavity to be maintained apart from one another at the locations of the cavities to provide cushioning. Suitable fluids can be gases such as air, carbon dioxide, nitrogen, or other suitable gases. Fluids can also be liquids or gels. The web 100 can include an inflation region 114, (e.g. a closed or open passageway suitable to receive an injected fluid). In one example, the inflation region 114 is a longitudinal inflation channel as shown by way of example in FIGS. 1 and 2A-B. The inflation region 114, as shown in FIGS. 1A-1D, can be a longitudinal inflation region that is disposed between the second end 124 of the transverse seals 118 and the first longitudinal edge 110 of the web 100. The longitudinal inflation region 114 can extend longitudinally along the longitudinal edge 110, and an inflation opening 116 can be disposed on at least one end of the longitudinal inflation region 114. The longitudinal inflation region 114 has a transverse width. In a preferred embodiment, the transverse width is substantially the same distance as the transverse dimension between the first longitudinal edge 110 and second end 124. It is appreciated, however, that, in other configurations, other suitable transverse width sizes can be used. In some embodiments, one or more of the inflation openings or ports can include a one-way valve, such as those disclosed in U.S. Pat. No. 7,926,507, herein incorporated by reference in its entirety.

In some embodiments, the fluid-holding cavities are inflatable/deflatable cavities 135 having an inflation port 123. In accordance with various embodiments, the cavities 135 are formed by unsealed locations between two plies of material (e.g. 107 and 105). In accordance with various embodiments, in the formation of cavities 135, at least one film ply (e.g. 105) includes protruding structures 137.

Figure 6:
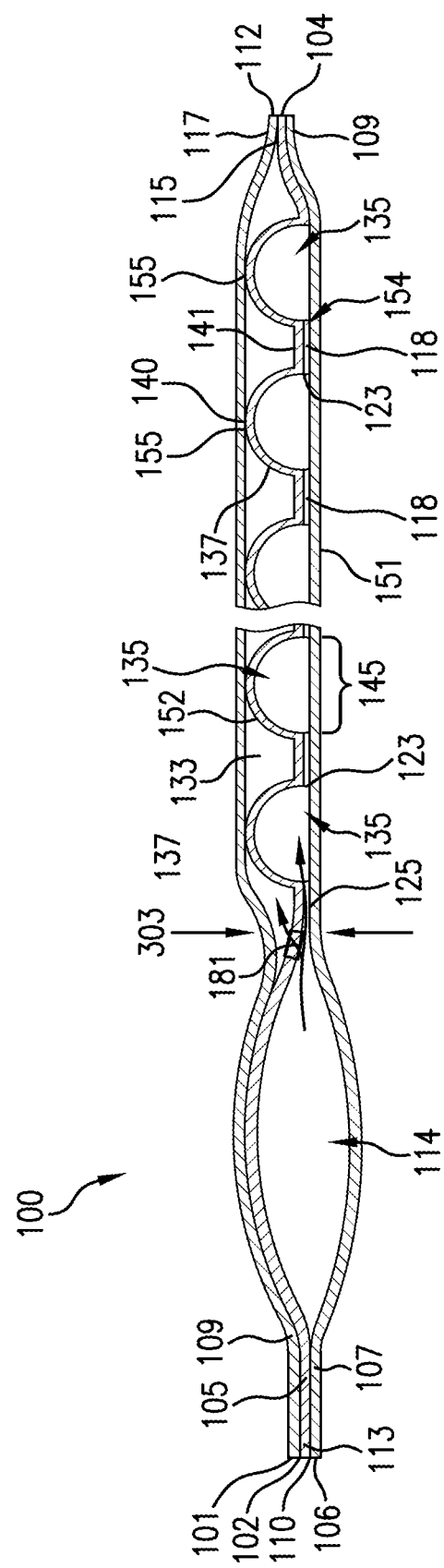
FIG. 6 is a cross-section of an inflatable web with inflatable sub-chambers and a tertiary ply forming a cavity that is inflatable from the inflation region.

In accordance with various embodiments, the protruding structures 137 can define a bounded three-dimensional shapes suitable for containing the fluids. The protruding structures 137 can also be collapsible for packing in a denser configuration than in the inflated form. This bounded volume can be defined in part by a complex surface protruding from at least one of the plies (e.g. 105) and which is distinguished from a base webbing 141 or valley of the ply. For example, when laid flat, the ply generally defines a planar form. While it is understood that the plies 105, 107 are flexible and therefore can define complex surfaces across their expanse as they are bent, folded, or otherwise deformed, when laid flat they can also generally conform to the flat surface across their expanse, thereby generally defining a planar surface. Even when defining a planar surface, the protruding structures 137 protrude away from the generally planar surface as separate complex surfaces, forming a plurality of individual distinct protruding structures in the ply. The complex surfaces forming the individual distinct protruding structures are present even without internal air pressure. For example, as shown in FIGS. 1C, 1D, and 6, protruding structures 137 protrude from ply 105 away from ply 107. In embodiments, in which ply 105 includes one or more protruding structures 137, the ply defines a formed ply 105. In embodiments, in which ply 107 includes one or more protruding structures, then ply 107 would additionally or alternatively define a formed ply. In embodiments, in which ply 107 does not include one or more protruding structures, then ply 107 defines a base ply 107. As discussed below, ply 107 may be a base ply in various embodiments, but in other embodiments, ply 107 may be a formed ply. For clarity, with respect to the examples shown in the various figures, ply 107 can be provided and referred to as a base ply, and ply 105 can be referred to as a formed ply. But, these are merely presented as examples and a person of ordinary skill in the art would understand that both plies 105, 107 could be formed plies or alternatively one ply is a formed ply.

In accordance with various embodiments, the structure of the protruding structures 137 can be defined by a three-dimensional plastic deformation in the surface of the material ply (e.g. 105), forming the complex surface. As used herein, a plastic deformation refers to permanent distortion that occurs when a material is subjected to tensile, compressive, bending, or torsion stresses that exceed its yield strength and cause it to elongate, compress, buckle, bend, or twist, thereby leaving a permanent structural deformation in the material. When the ply is originally manufactured, it can have a generally uniform cross-section. The protruding structures 137 are separate plastic deformations of the material forming the separate complex surfaces. In various examples, the plastic deformation is not uniform across a protruding structure 137, thus forming the complex curve. In a particular example, some portions of the formed ply (e.g. 105) are plastically stretched away from the generally expansive surface of the film and discrete locations defining the complex surfaces. In such embodiments, on a structural level, the material of the ply would show the polymer plastically deformed, plastically stretched, thinned, and/or permanently physically altered (meaning the structure will not naturally return to its previous shape or size) at the locations of each of the protruding structures 137. The base ply (e.g., 107) closes the generally open side on the concave side of the protruding structures 137, forming the cavity or sub-chamber 139. Multiple connected sub-chambers 139 can define a chamber 120 as shown in FIGS. 1C, 1D, 5C, and 6.

In various embodiments, the protruding structures 137 have a perimeter 143 that defines an opening to be closed by the base ply (e.g., 107). In some embodiments, the formed ply 105 and the base ply 107 are sealed along a portion of the perimeter of the protruding structures 137. Additionally or alternatively, the formed ply 105 and the base ply 107 are sealed along an entirety of one or more the perimeters of the protruding structures 137. The opening has an area 147 that is less than the surface area of the surface forming the protruding structure 137 that protrudes away from the base ply (e.g., 107). In embodiments in which the protruding structure 137 is formed by plastically stretching, it is the material that previously covered the opening area 147 that is plastically stretched out to form the protruding structure 137.

In accordance with various other embodiments, the structure of the protruding structure 137 can be formed from other suitable structures defining the protrusion of complex surfaces from the ply. For example, the protruding structures 137 can be molded in place, avoiding the plastic deformation in the material of the ply. In another example, the protruding structures 137 can include a second capped structure, heat-sealed or otherwise adhered to the surface of the ply. While not necessarily enumerated herein, other suitable structures defining complex surfaces protruding from the ply, as would be understood by a person of ordinary skill in the art, are also contemplated herein.

In accordance with various embodiments, the protruding structures 137 can protrude from one ply, defining a single direction of chamber protrusion, or from both plies, defining protrusions from both surfaces of the web 100. In one example, the protruding structures 137 protrude from one formed ply (e.g., 105), but not the base ply (e.g., 107). In such examples, the base ply (e.g., 107) forms a portion of the bounded cavity but is defined by its natural shape in response to the fluid pressures, whereas the protruding structure of the formed ply (e.g., 105) takes on the applied shape of the protruding structures 137. Thus, the base ply (e.g., 107) would not necessarily protrude at the location of the cavities in the absence of internal fluid pressure. Even in the presence of internal fluid pressure, the base ply (e.g. 107) protrudes minimally or significantly less than the protrusion of the chamber 120 in the same region of the web 100. In another example, the protruding structures are defined in both plies but at non-opposing locations. Stated another way, in a location where a protruding structure 137 is located in one ply, a protruding structure 137 is not located in the immediately opposing location of the other ply. In another example, various protruding structures 137 are independently defined with both plies at the same or similar locations such that the chambers protrude in both directions at overlapping locations of the plies. While shown as circular as an example, it should be appreciated that the protruding structures 137 can include a variety of suitable shapes and dimensions. For example, the protruding structures 137 can be rectangular, triangular, oval, oblong, etc.

In contrast to traditional protective packaging that includes preformed inflated enclosures (see, e.g. bubble wrap), here, in accordance with various embodiments, the protruding structures 137 are closed in a way that allows the cavities 135 defined thereby to be inflatable and/or deflatable after the manufacturing of the web 100. For example, each of the cavities 135 can include an inflation port 123. A channel 125 can connect with the inflation port 123 or similar suitable structure for adding or removing fluid to or from the cavities 135 after formation of the cavities 135. In some embodiments, the various cavities 135 are also deflatable and inflatable after the manufacturing of the web 100. This is in contrast to traditional protective packaging, such as bubble wrap, in which the fluid is captured in the bubbles at the time of manufacturing and there is no way to deflate the bubbles after manufacturing of the material without destroying the bubbles, in which case the bubbles are not refillable. In accordance with various aspects of the present disclosure, the cavities 135 can be inflated after manufacture of the web 100 and after the cavities 135 of the web 100 have been deflated. This can be done by injecting air into an inflation port 123 of the cavities 135.

In accordance with various embodiments, multiple cavities 135 are inflatable and deflatable, together forming a chamber 120. For example, a sub-chamber 139 can have inflation ports 123 that are interconnected with another sub-chamber 139 via channel 125. Together, the group of interconnected sub-chambers 139 forms a chamber 120 with a common inflation channel 125 that is suitable to distribute the fluid to each of the sub-chambers 139 through their respective ports 123. As shown by way of example in FIGS. 1A-1B, the common inflation channel 125 can be a channel that extends between a row of chambers 120 serially (i.e. daisy-chained). In another embodiment, the common inflation channel can be a manifold that extends to each of the chambers 120 in parallel (shown by way of example in FIG. 4B, in which an orphan chamber is fed from the adjacent chamber in parallel). In accordance with various embodiments, the channel 125 may extend from the inflation region 114. In some embodiments, the web 100 includes multiple chamber channels 125 with each chamber channel 125 directed to separate chambers 120. For example, as shown in FIGS. 1A-1B, a plurality of channels 125 extends from the inflation region 114. In this example, each channel extends transversely across the material from a longitudinal inflation region 114. Additionally, different groups of chambers are provided along the longitudinal length of the web 100.

The chamber 120 is sufficiently bounded to retain a fluid after being sealed. In some embodiments, the chamber 120 can be inflatable after being formed. In some embodiments, the chamber 120 can be deflatable after being formed. In some embodiments, the chambers 120 can pass fluid back and forth between sub-chambers even after a final seal is applied to the chamber, preventing additional fluid from being added to the chamber. In some embodiments, the chamber 120 is also deflatable after being formed and prior to being sealed.

As shown by way of example, the web 100 can include transverse rows of chambers 120 formed from multiple sub-chambers 139, each of the chambers being connected to inflation region 114. In this way, fluid injected into the inflation region 114 can pass though the channels 125 and into the inflation port 123 of each of the sub-chambers 139 filling the sub-chambers 139 and the chamber 120.

In accordance with various embodiments, the web 100 can have a relative few large chambers per section (i.e. between lines of weakness discussed herein). For example, each section may have one large chamber. In another example, each section may have 2-5 chambers. In another example, each section may have 5-20 chambers. In other embodiments, the web 100 can have a relative large number of protruding structures that may or may not form chambers. A large number of protruding structures are referred to as caps. The caps can be the plastically deformed protruding structures 137 as discussed above. For example, more than 20 plastically deformed protruding structures per section may be referred to as caps.

In some embodiments, the cavities 135 can be individually inflatable. For example, each cavity 135 can include an individual inflation port to the exterior of the web 100. Such an inflation port can include a one-way valve, a sealable port, a mechanically closing port, or the like.

In accordance with various embodiments, when the web 100 is inflated and being prepared to be used as protective packaging, one or more of the inflation port 123, the channel 125, or the inflation region 114 can be sealed, causing at least a partial isolation in the chambers 120 and/or sub-chambers 135. Once the final seal is applied, embodiments lacking a valve are no longer sealable or deflatable. Up to this point, fluid forced into one or more of the inflation region 114, inflation port 123, the channel 125, sub-chamber 135, or chamber 120 can be forced back out and forced back in again. This allows for the material to be inflated and then deflated to a more condensed state for easier handling and shipping. After being handled and when being prepared as protective packaging, the web 100 can be inflated and have the final seal applied.

In accordance with various embodiments, the inflation channel 125 can be an extended protrusion in the formed ply 105. These extended inflation channels 125 can be made similar to the protruding structures 137 discussed above. For example, these channels can have a structure that includes a plastic deformation in the formed ply 105. In other embodiments, the channels 125 may be formed by an unsealed region between the formed ply 105 and the base ply 107. Fluid can then pass between the unsealed plies 105 and 107. Seals can then bound the sides of the channels to direct fluid from one cavity to the next. In various embodiments, the channels are significantly smaller than the chambers 120 and/or the protruding structures 137.

Figure 5C:
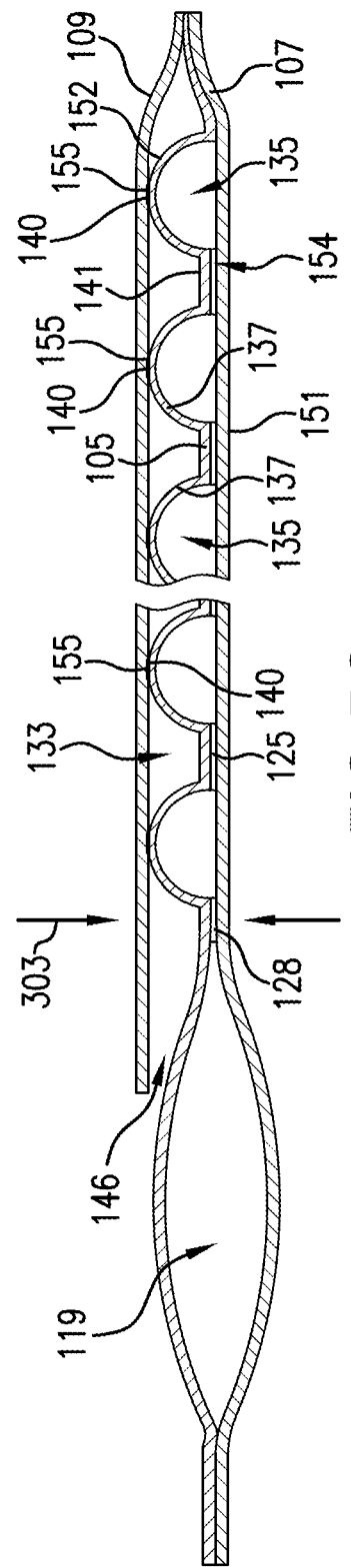
FIG. 5C is a cross-section of the inflatable web based on a variation of FIG. 5B with the cavities being connected with one another.

In some embodiments, the fluid-holding cavities can be isolated cavities 121 filled with fluid upon formation, such as the multiple isolated cavities 121 shown in FIGS. 5A and 5B. The isolated cavities 121 have no inflation port and thus can only release the fluid upon destruction. Similar to the inflatable cavities 135 discussed above, the isolated cavities are formed from a protruding structure 137 similar to those discussed above. As a distinction, however, the isolated cavities 121 are filled when they are formed as they do not have an inflation port or connected channel and are thus not inflatable or deflatable unless destroyed. An example of this structure is shown in FIG. 5A-5C. Here, plies 105 and 107 are sealed to one another along the full circumference of the cavities 121 without the presence of the inflation port or channels.

In some embodiments, the isolated cavities can include intra chamber channels 09 can have longitudinal seals along the edges 113 and 115 along with a final seal along the inflation region after inflation. Each of these outer seals enclose the region around the protruding structures 137. The seals 155 hold the tertiary ply 109 to the outer surface of the protruding structures 137. In some embodiments, the seals 155 hold the tertiary ply 109 to peaks 140 of the plurality of protruding structures 137. According to some embodiments, the protruding structures 137 have flattened peaks 140 onto which the tertiary ply 109 is sealed. Having the tertiary ply 109 adhered to the peaks 140 of the protruding structures 137, via seal 155, enables the tertiary ply 109 to have a relatively flat structure as it is disbursed over the plurality of protruding structures. The rigidness of the tertiary ply 109 can be affected by the dispersion of the protruding structures 137 along formed ply 105. The chains of protruding structures 137 may be parallel, may be offset, and/or may be in other suitable configurations. According to various embodiments, the inflatable web 154, when inflated, has a minimum height of at least about 1 mm, 5 mm, or 10 mm, and a maximum height of 10 mm, 15 mm, or 30 mm. It is noted, however, that the inflated inflatable web may incorporate other suitable minimum and/or maximum heights. According to various embodiments, the inflatable web 154, when inflated, has a minimum diameter of at least about 1 mm, 5 mm, or 10 mm, and a maximum diameter of 10 mm, 15 mm, or 30 mm. It is noted, however, that the inflated inflatable web may incorporate other suitable minimum and/or maximum diameters.

In embodiments, discussed below, the volume between ply 105 and ply 109 and within the seals is the secondary cavity 133. Here, the secondary cavity 133 is shown containing fluid. In some examples, the fluid may be open to atmospheric air (see e.g. FIGS. 2A-3B) or the fluid may be sealed. For example, the fluid here may have been trapped at the time of sealing the ply 109 to ply 105. In some embodiments, this cavity 133 is passively inflatable (e.g. FIGS. 2A-3B). In some embodiments, this cavity 133 is actively inflatable (e.g. FIGS. 5A-6) through an inflation channel 146. In some embodiments, cavity 133 is jointly inflatable and/or jointly sealable (as shown in FIG. 5B) from the cavities 135 defining by the protruding structures 137. In some embodiments, the secondary cavity 133 can form a chamber that is separately inflatable and/or separately sealable (as shown in FIG. 5C) from the cavities 135 defining by the protruding structures 137.

In various embodiments, the web 100 includes one or more separation regions 126. The separation regions 126 facilitate separation of two adjacent web portions such as separate groups of chambers 120. The separation regions 126 can positioned along the inflatable chambers 135, between the inflatable chambers 135, and/or along other suitable location of the web 100. The separation regions 126 can be separated such as by tearing the web 100 by hand or with the assistance of a tool or machine. A separation region 126 can facilitate either or both of partial or total separation of adjacent inflatable chambers 120. As illustrated in FIG. 1B, the separation region 126 is positioned between chambers 120. In this way, chambers 120 can be easily separated from one another. In the embodiment of FIG. 1B, thin transverse seals 118 are arranged adjacent to the separation regions 126, on either side. While illustrated adjacent to the seal 118, it is appreciated that the separation region 126 can also extend through the seal 118, or through unattached plies 105,107,109 (as included in the particular embodiment) such as through the various inflatable cavities and the plies defining them. In various embodiments, the separation regions 126 can include lines of weakness that can be used to separate the regions.

By way of example, FIG. 1A illustrates an explosive view of an inflatable web with inflatable sub-chambers, and FIG. 1B illustrates an inflatable web 100 with inflatable sub-chambers 139 forming multiple transverse chambers 120 that reoccur longitudinally of the length of the inflatable web 100. Each of the sub-chambers 139 in each chamber 120 is connected by channel 125. The channel 125 also connects to inflation region 114 for inflation or deflation of the chamber 120. In some examples, the web shown in FIG. 1B can be made with just plies 105 and 107, or the web shown in FIG. 1B can be made with more plies, such as plies 105, 107, and 109. As these are merely examples, it is appreciated that any suitable number of plies can be used in the formation of web 100. The connected sub-chambers form chamber 120.

FIGS. 1C-1D are cross-sections of the inflatable web 100 based on another particular embodiment of FIG. 1B. Here, web 100 includes plies 105, 107, and 109. Again, these are merely examples and it is appreciated that any suitable number of plies can be used in the formation of web 100. As shown in the cross section of FIG. 1C, which is taken along the cross section line IA-IA shown in FIG. 1B, and FIG. 1D, which is taken along the cross section line IB-IB shown in FIG. 1B, the protruding structures 137 are formed in ply 105 and sealed to base ply 107 forming the sub-chambers 139. The connected sub-chambers form chamber 120. The tertiary ply 109 can be sealed to formed ply 105 at the peaks of the protruding structures 137. The cavity defined therebetween is a secondary cavity 133. One inflation region 114 is formed between plies 105 and 107. Fluid is injectable into chamber 120 via inflation region 114. In some embodiments, the tertiary ply 109 extends across each of the protruding structures 137. Alternatively, the tertiary ply 109 can extend across a portion of the protruding structures 137.

Figure 2A:
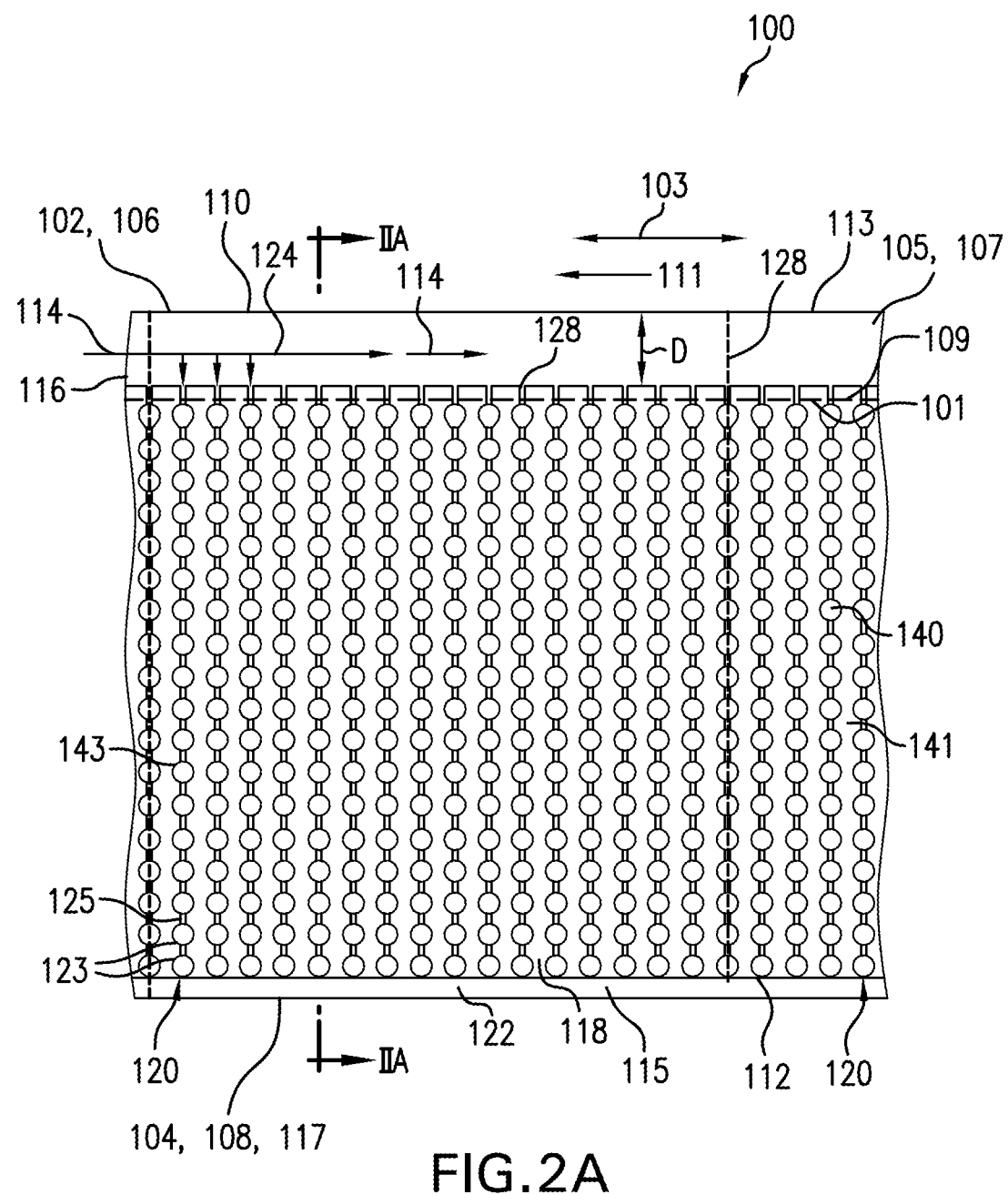
FIG. 2A is an inflatable web with inflatable sub-chambers and a tertiary ply having openings near the edges.
Figure 2B:
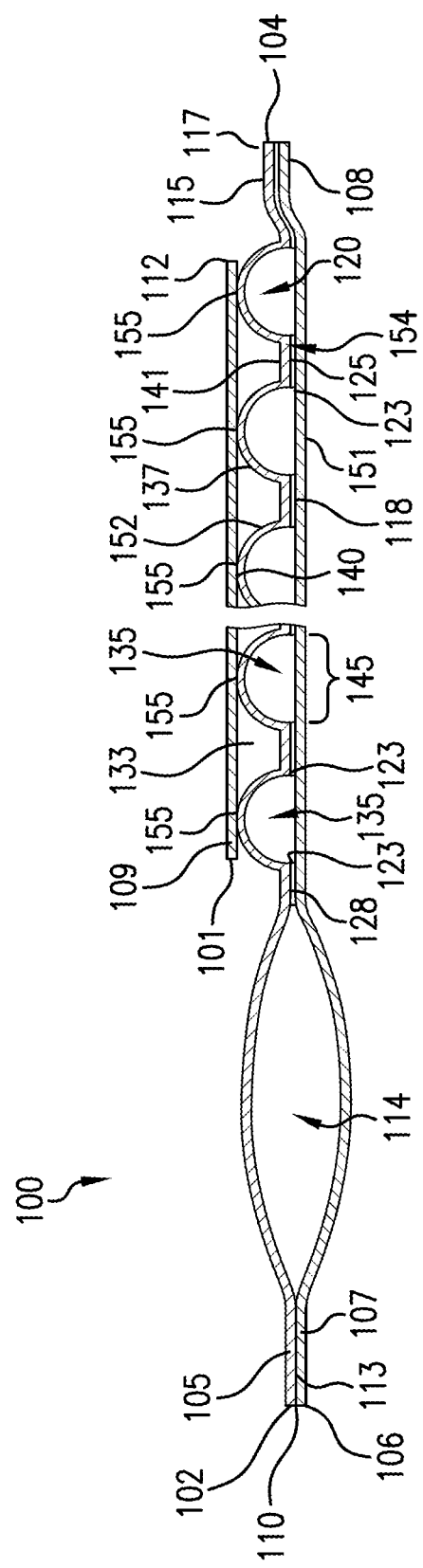
FIG. 2B is a cross-section of the inflatable web of FIG. 2A.

FIGS. 2A-2B illustrate another example of a passively inflated cavity 133. In this embodiment, the tertiary ply 109 includes openings 179 near the edges 101, 113 thereof. The openings 179 allow air to pass through the ply 109 to the cavity 133 between base ply 109 and formed ply 105. Thus, when the chambers 120 are inflated, cavity 133 can fill with fluid (e.g. atmospheric air). This limits ply 109 from adhering to ply 105 via a vacuum there between.

Figure 3A:
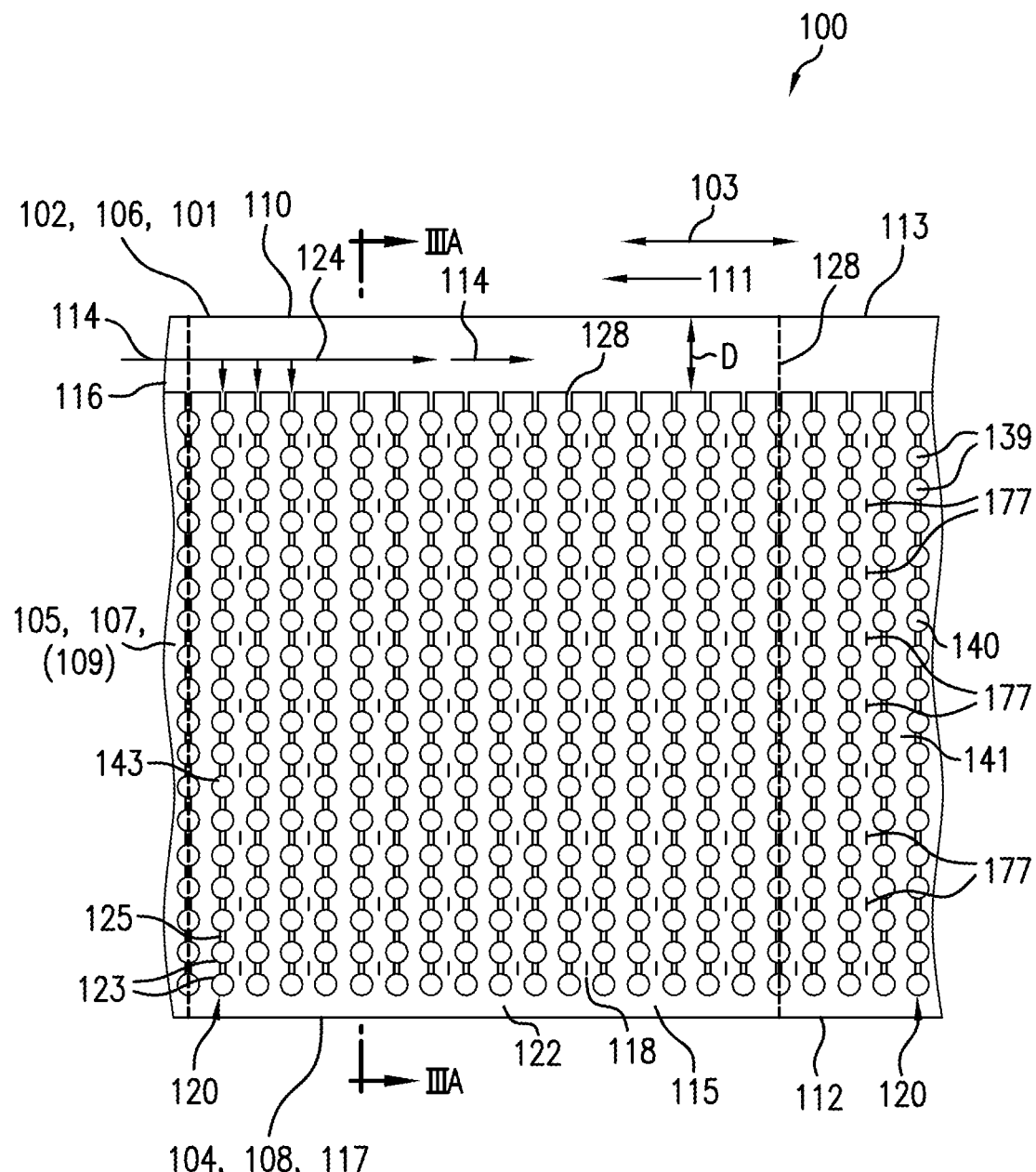
FIG. 3A is an inflatable web with inflatable sub-chambers and a perforated tertiary ply.
Figure 3B:
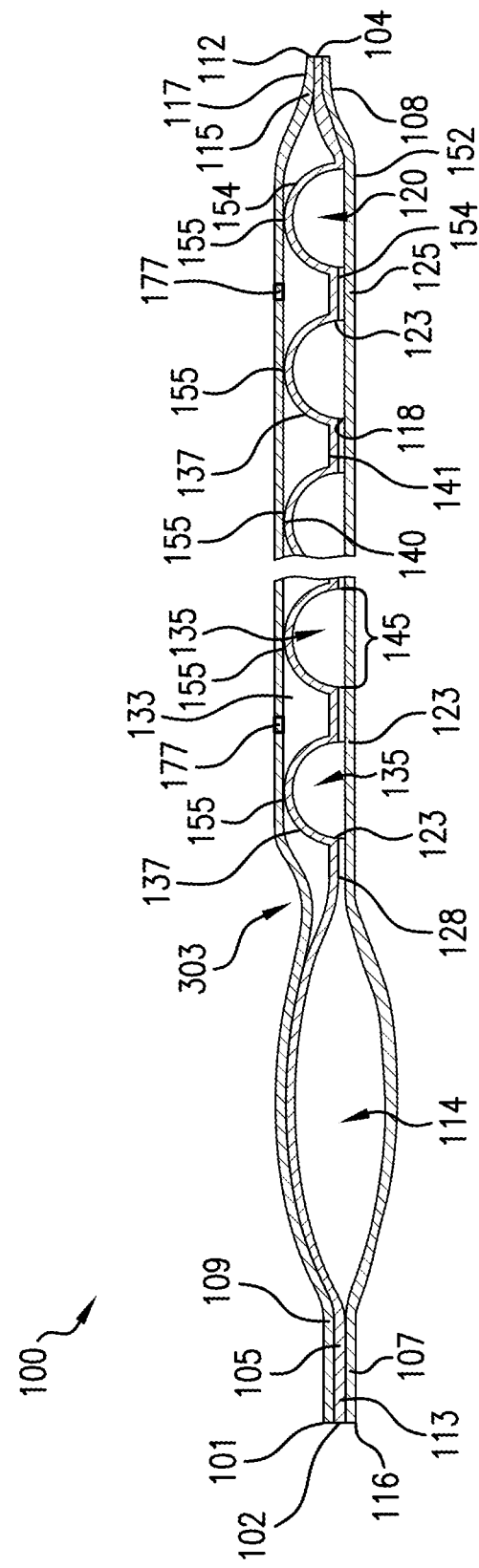
FIG. 3B is a cross-section of the inflatable web of FIG. 3A.

FIGS. 3A-3B illustrate another example of a passively inflated cavity 133. In this embodiment, the inflatable web 100 includes inflatable sub-chambers and a perforated tertiary ply 109. The perforations 177 pass through the tertiary ply 109 but not the other plies. The perforations 177 allow air to pass through the ply 109 to the cavity 133 between ply 109 and formed play 105. Thus, when the chambers 120 are inflated, cavity 133 can fill with fluid (e.g. atmospheric air). This limits ply 109 from adhering to ply 105 via a vacuum there between.

Figure 4A:
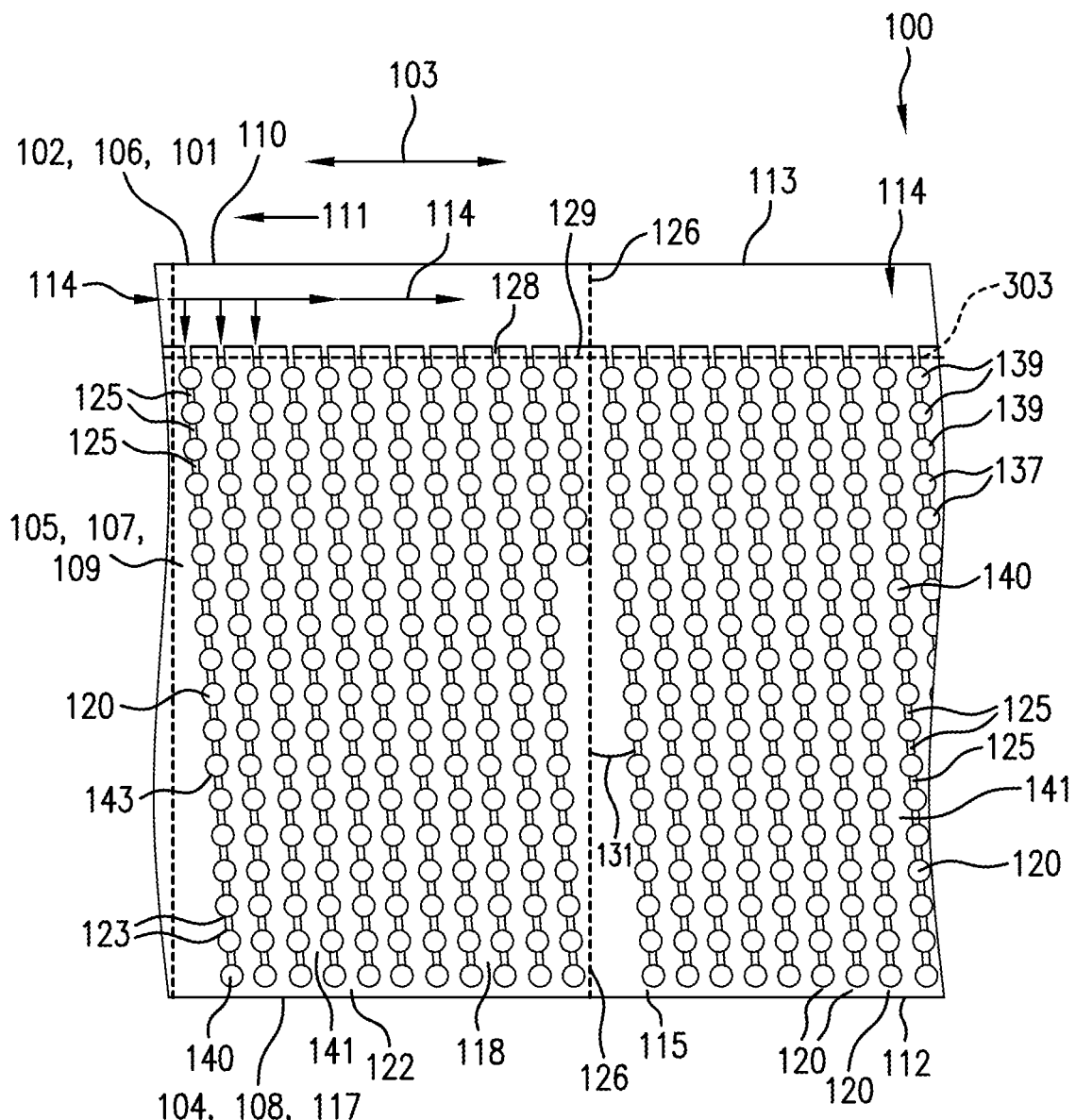
FIG. 4A is an inflatable web having diagonally-oriented inflatable sub-chambers.
Figure 4B:
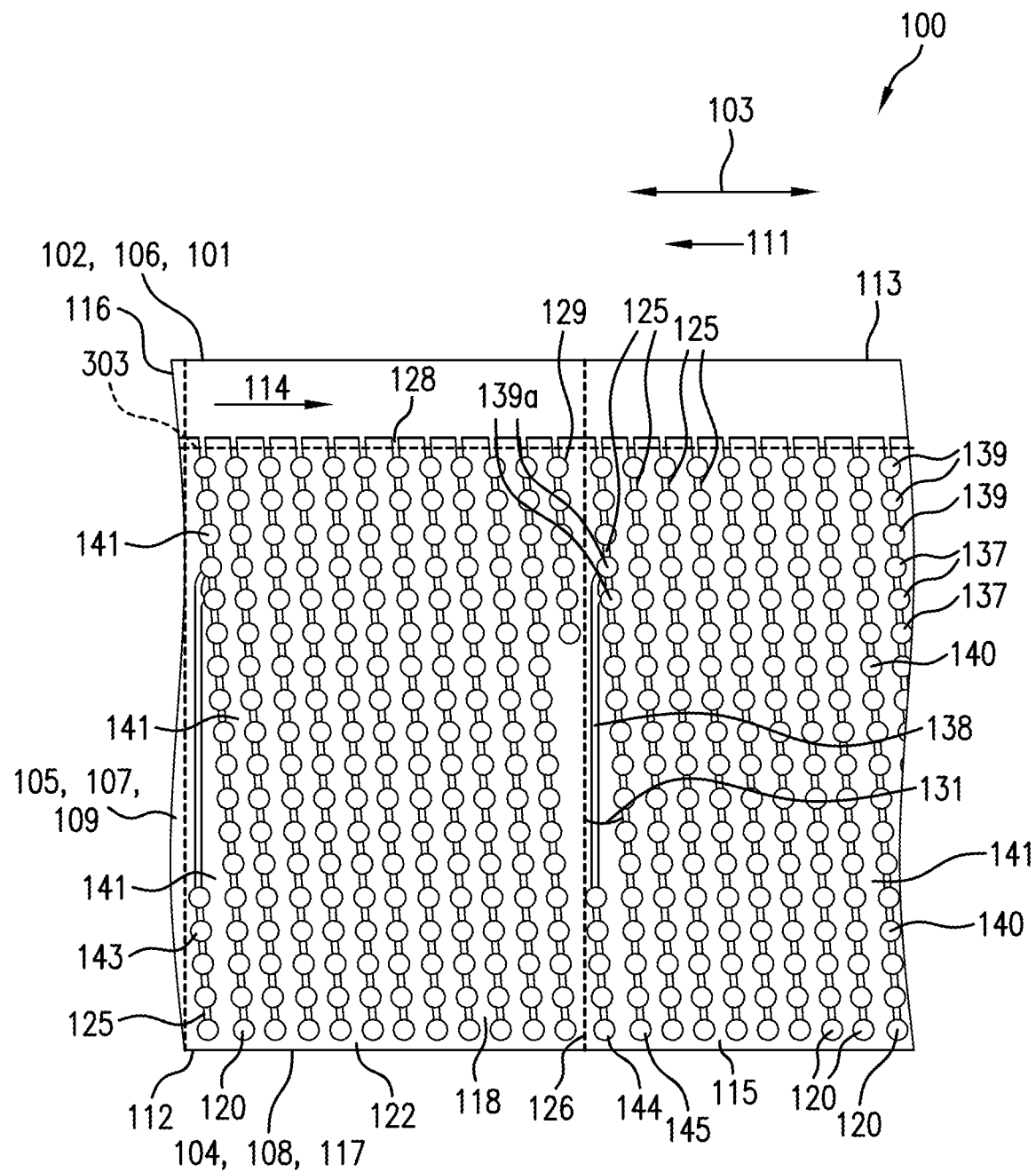
FIG. 4B is an inflatable web having diagonally-oriented inflatable orphan sub-chambers.

In other examples, FIG. 4A-4D illustrate other examples of the web 100. Not all references are shown, but each of these webs can be formed in accordance with the various structures discussed above as would be applicable to the particular example as understood by a person of ordinary skill in the art. For example, FIG. 4A includes an inflatable web 100 having sub-chambers 139 forming chambers 120. However, in this example, the chambers 120 are positioned at an angle 131 with respect to the inflation region 114. This angle 131 can improve the deflation of the chambers after they are originally formed. This is discussed in more detail below. FIG. 4A also shows the termination of chamber 129. Chamber 120 terminates before traversing across the web 100 as the other chambers 120 do. In having a chamber 129 with an early termination, a gap is formed, allowing for the application of a line of weakness to form the separation region 126. FIG. 4B illustrates an inflatable web 100 similar to FIG. 3A with the termination of chamber 129. FIG. 4B, however, also includes an orphan chamber 144. Here, a channel 138 can branch off a channel 125b or sub-chamber 139a thereby feeding chamber 144. Channel 138 then feeds the orphan chamber 144 in parallel with the main channel 125b that feeds the next adjacent chamber 145.

Figure 4C:
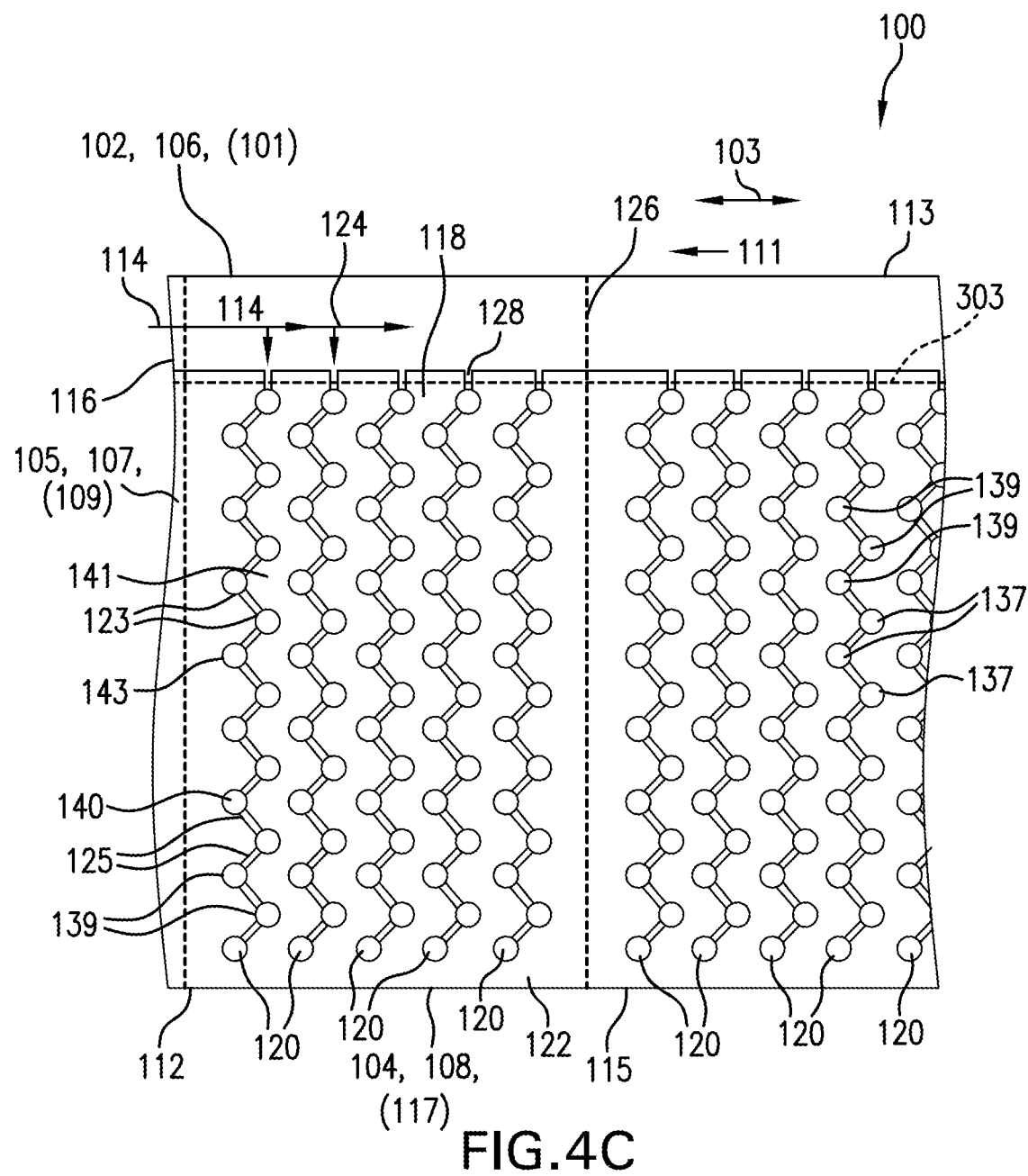
FIG. 4C is an inflatable web having a staggered orientation of inflatable sub-chambers.

FIG. 4C illustrates an inflatable web 100 having a staggered orientation of inflatable sub-chambers 139. Here, each of the sub-chambers 139 are connected to the next adjacent sub-chamber 139 via a channel 125. Each of the different channels leave the sub-chamber at opposite angles. This leaves a staggered pattern of sub-chambers 139, forming a zigzag chamber design. Doing this allows more sub-chambers 139 to be packaged in a single web 100.

Figure 4D:
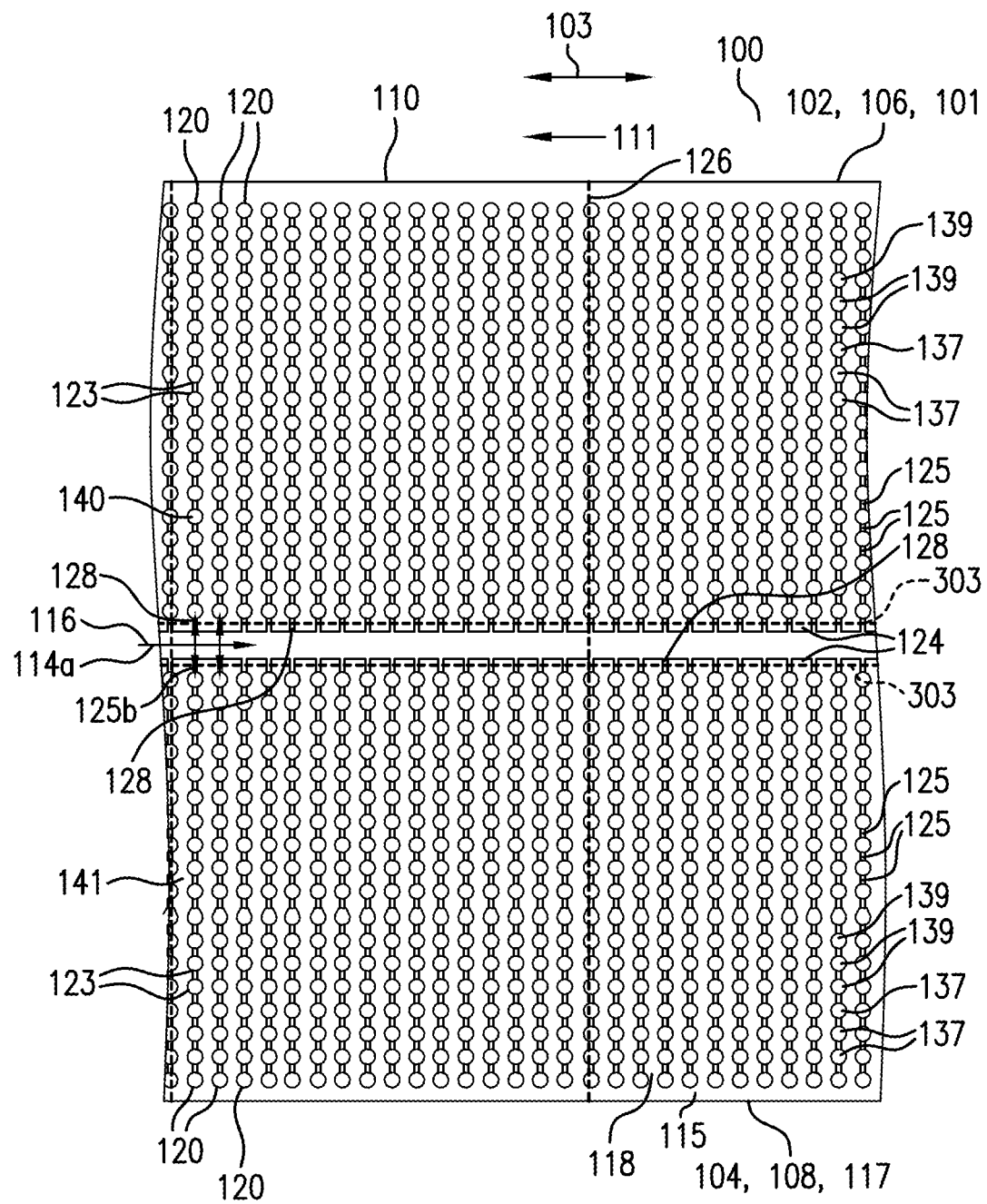
FIG. 4D is an inflatable web having a linearly transverse orientation of inflatable chambers with a central inflation region.

In FIG. 4D, the chambers 120 have a linearly transverse orientation with channels 125 connected to a central inflation region 114a. One set of channels 138 exit the inflation region in one direction and another set of channels 125b exit the inflation region in the opposite direction. This allows for chambers 120 to extend from the inflation region in both directions. In such an embodiment, the final seal to seal the chambers 120 would be applied on both sides of the inflation region 114a.

In FIG. 5A, the inflatable web 100 has a fluid permeate the web 100 along one or more directions 136. Here, the inflatable web 100 includes isolated cavities 121. The cavities 121 are surrounded by the secondary cavity 133. The inflation region 119 directs fluid into the secondary cavity 133. A final seal along the inflation region 119 seals the fluid into the secondary cavity 133. FIG. 5A also illustrates segment seals 153. The segment seals 153 seal the secondary cavity 133 from the lines of weakness 126. Thus, the segments of the web 100 can be torn at the lines of weakness 126 without rupturing the secondary cavity 133. FIG. 5B is a cross section of the inflatable web of FIG. 5A taken along cross section line VA-VA. FIG. 5B shows the isolated cavities 121 formed by protruding structure 137 in formed ply 105. The seal between formed ply 105 and base ply 107 isolates the cavities 121. The tertiary ply 109 is then sealed to ply 105 at seals 155, forming the secondary cavity 133. FIG. 5C includes a variation to FIG. 5B in which the cavities are connected to one another via intra chamber channels 166. While the cavities here are still filled with fluid at formation of the inflatable web, the fluid can move between the connected cavities but not otherwise be deflated without rupturing them.

In FIG. 6, cavity 133 is sealed on 3 sides, forming a cavity that is inflatable from the inflation region 114. Inflation region 114 includes an opening 181 into the cavity 133. When longitudinal seal 303 is applied, the opening 181 is separated from the cavity 133 thereby sealing cavity 133 trapping fluid therein. In this way, both chambers 120 and cavity 133 are actively inflated with fluid.

The inflatable structure of the inflatable web is positioned between, and adhered to, the outer plies and maintains the outer plies at a distance between each other along an area of the inflatable web. This inflatable structure thus acts as an expanded internal structure between the outer plies. The forces applied between the outer plies and the internal structure provide rigidity and stiffness to the structure, causing the inflatable web to act as a framed structure, similar to an I-Beam, truss, or other similar framed structure.

As used herein, "inflated" as a verb refers to actively injecting a fluid. The term "inflated" as a an adjective can describe a fluid that was "injected" into a chamber or cavity or the term can describe a chamber or cavity occupied by a fluid regardless of whether the fluid was injected or trapped therein, such as by the manufacturing process.

The protective packaging material described above is usable with a backing sheet to form envelopes or mailers suitable for protecting the contents therein. The backing sheet can be layered on the exterior. The backing sheet can include at least one of a paperboard, polymer sheet, craft paper, or a fiberboard (e.g., a corrugated fiberboard). Mailer or envelope is then formed as padded envelope, also known as a cushioned mailer. It can be an envelope incorporating protective padding to protect items during shipping. Here, the web 100 can be used as the padding.

Figure 7A:
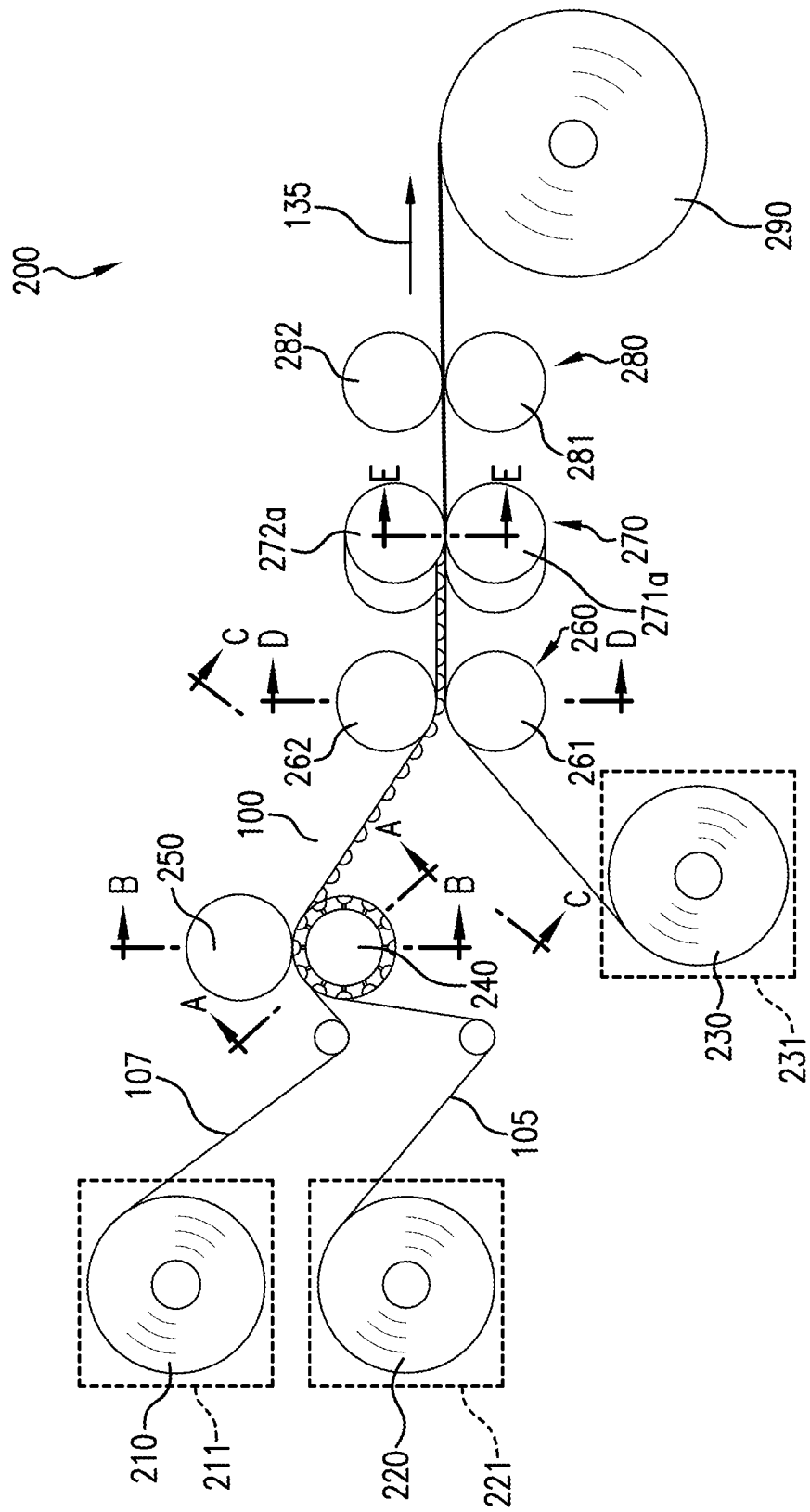
FIG. 7A is a web forming apparatus.
Figure 7B:
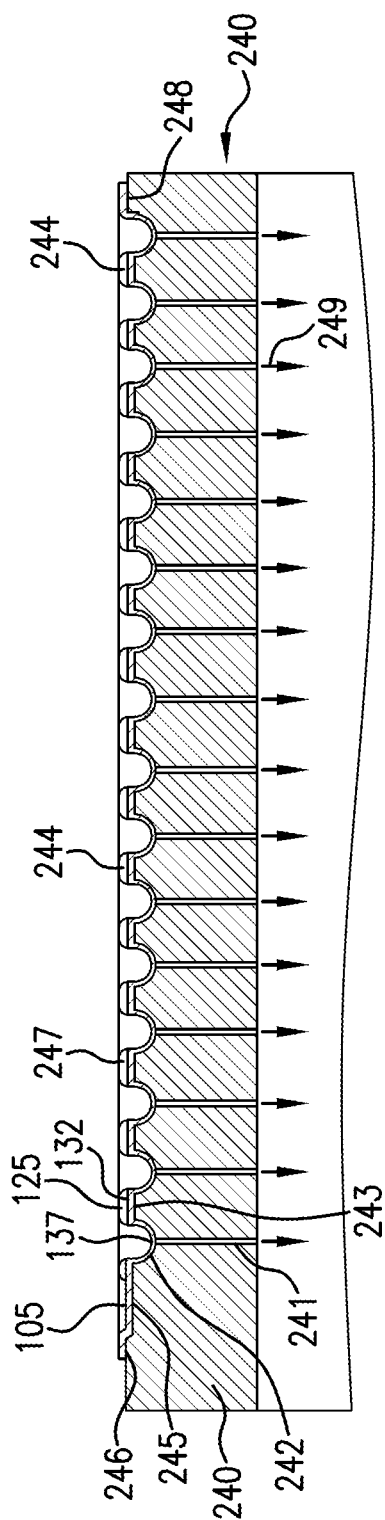
FIG. 7B is a cross-section of a sub-chamber forming element from the web forming apparatus of FIG. 7A along cross section line A-A.
Figure 7C:
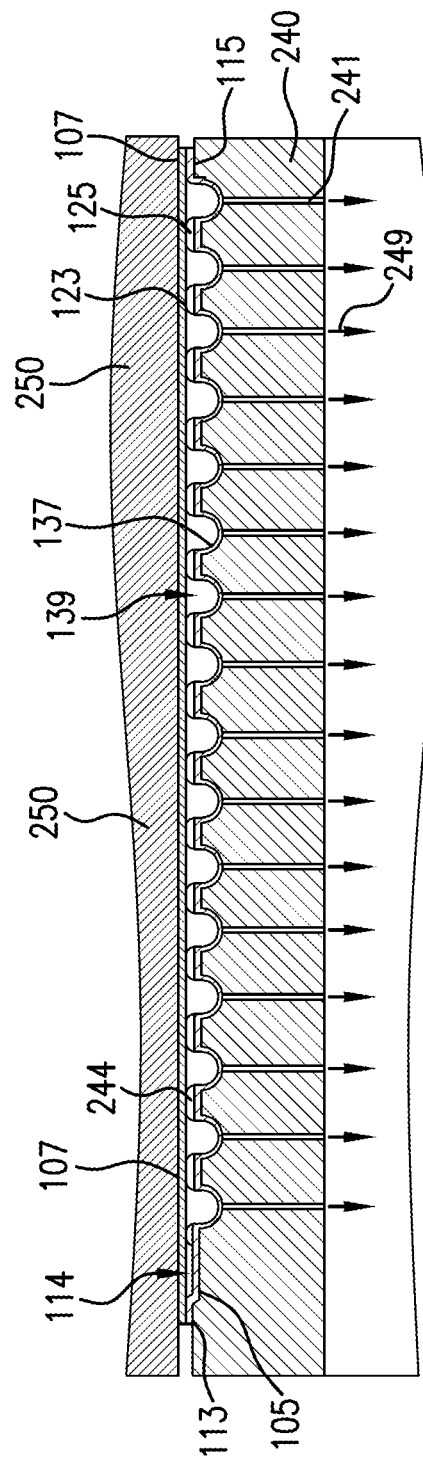
FIG. 7C is a cross-section of a nip section of the sub-chamber forming element from the web forming apparatus of FIG. 7A along cross section line B-B.
Figure 8:
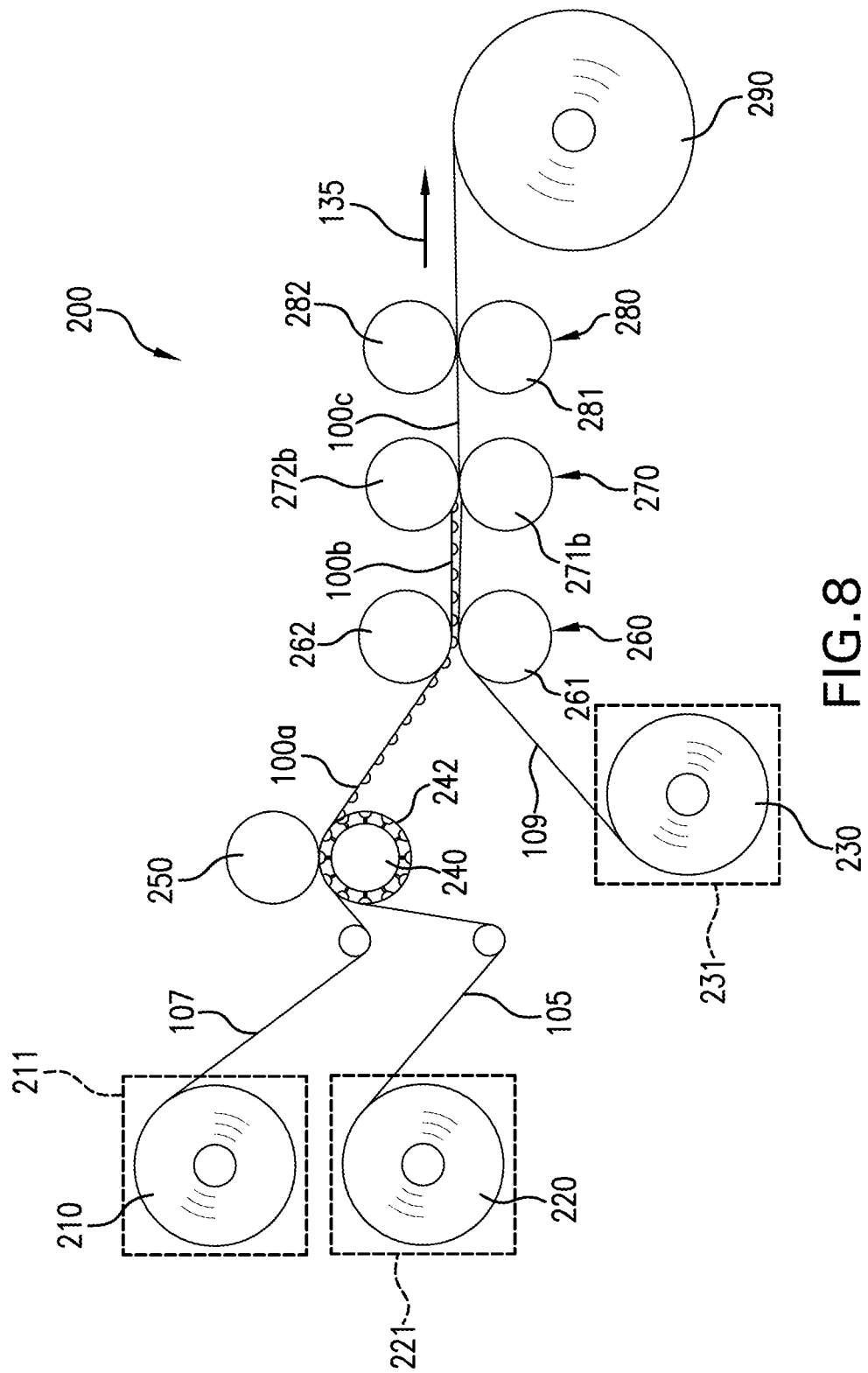
FIG. 8 is a web forming apparatus.

In accordance with various embodiments, a protective packaging manufacturing system 200, 300 suitable to form an inflatable web 100 and/or inflate the web 100 into protective packaging material is provided. In accordance with various embodiments, as illustrated in FIGS. 7A-8, web forming apparatuses 200 can include one or more elements for forming the expanded regions into at least one of the plies. The web forming apparatus 200 can include a film supply 210, 211 and a film supply 220, 221. The film supply 220, 221 dispenses formed ply 105. The film supply 220, 221 directs the formed ply 105 to an extended volume-forming device 240. The extended volume-forming device 240 forms the protruding structures 137 on formed ply 105. The web forming apparatus 200 also includes an attachment element 250. The attachment element 250 opposes the extended volume-forming device 240 and receives the base ply 107 from the film supply 210, 211. The attachment element 250 presses the base ply 107 against the formed ply 105, while the volume forming device 240 presses the formed ply 105 against the base ply 107. The attachment element 250 aids in sealing the plies 105 and 107 together. When formed ply 105 is sealed to base ply 107, some fluid is trapped in the protruding structures 137 such that they are at least partially inflated. In embodiments in which the web 100 includes isolated cavities, the protruding structures 137 have all the fluid in them that they will receive.

The sealed plies form the web 100. In some embodiments, the formation of the web 100 can be finished at this point. In other embodiments, a tertiary film ply 109 can be added. In such embodiments, the web 100 is directed to a second attachment device 260. An additional film supply 230, 231 directs film ply 109 to the second attachment device 260.

The second attachment device 260 includes opposing elements 261, 262 that press the film ply 109 against the formed ply 105 and attaches the two together on top of the protruding structures 137 on the formed ply 105. The web 100 is directed to a deflation element 270. The deflation element 270 includes opposing elements that compress the web 100, forcing at least some of the fluid contained therein out, forming the compressed web 100c. This compacts the web 100, making it easier to handle or ship. A second set of processing elements 280 can also be included. These processing elements can remove additional fluid from the web 100, guide the web 100 to a roll, or perform any other beneficial processing step. The compressed web 100c can be directed to a storage mechanism 290 which can prepare the web for transportation or ready it for inflation by the inflation system 300.

In accordance with various embodiments, the various film supplies 210, 211; 220, 221; and 230, 231, provide the film to the system for forming the web 100. In some embodiments, the film supply is a roll (e.g., 210, 220, 230) or fanfold film supply. In some embodiments, the film can be formed at the web forming system via a film extruder (e.g. 211, 221, 231). The film extruder can manufacture the film and direct the newly made film to the forming device. The film supply 210 can additionally include a guide path including rollers positioned to direct the film appropriately.

In accordance with various embodiments, the extended volume forming device 240 forms the protruding structures and/or the sub-chambers discussed above. In one example, the forming device 240 includes an array of chamber forming recesses 242. The chamber forming recesses 242 can be included as part of a chamber-forming die. In some examples, the chamber-forming die is part of a rotating cylinder. In various embodiments, the chamber-forming device includes at least one of a thermoforming, vacuum forming, or pressure forming mechanism. In some examples, the forming device 240 is heated to improve the forming of the protruding structure 137. In this way, the formed ply 105 is heated by the forming device 240 and then vacuumed or otherwise pulled into the chamber forming recesses 242 causing plastic deformation of the ply at each of those recesses forming the protruding structures 137. In other embodiments, the forming device 240 is heated to cause the formed ply 105 to seal to the base ply 107. For example, each of the chamber forming recesses 242 includes a vacuum port 241 therein, that is suitable to apply a vacuum against the formed ply 105 positioned directly against the chamber-forming device 240. The film ply is pulled into and plastically deformed to take the shape of the chamber forming recess. In this way, the forming device 240 can plastically deform the surface of formed ply 105, creating protruding structures 137 that can define cavities or sub-chambers as discussed above. The chamber-forming device 240 can also include a channel recess 243. The channel recess can form extended channels 125 in the formed ply 105. The channels are formed by plastically deforming the film ply positioned directly against the chamber-forming device and plastically stretching the material to create a plastically deformed channel. Additionally or alternatively, the channels 125 can be formed by having the channel regions unsealed. The unsealed regions can include the chamber forming recesses and fluid paths that extend between at least some of the chamber forming recesses.

In various embodiments, the chamber-forming device 240 can also include additional recesses for forming additional features in the formed ply 105. For example, the chamber-forming device 240 can include a channel recess 247. The channel recess 247 can be formed in the surface of the chamber-forming device 240. The chamber-forming device 240 can pull (e.g. via a vacuum port) the ply 105 into the channel recess 247, plastically deforming an extended channel 132. Additionally or alternatively, the chamber-forming device 240 can include an inflation region recess 245. The chamber-forming device 240 can pull (e.g. via a vacuum port) the ply 105 into the inflation region recess 245 in direction 249. While in some embodiments, the inflation region recess 245 and/or the channel recess 247 may actively pull and deform these regions of ply 105. In some embodiments, the inflation region recess 245 and/or the channel recess 247 may merely lack sufficient pressure to press the ply 105 against ply 107 along these regions to form a sufficient seal. Absent a seal, fluid can pass through these regions. In this way, the features (e.g. inflation region and/or channel) can be formed without plastic deformation.

In various embodiments, the forming device 240 can include pinch regions that include surfaces that have a sufficiently minimal gap with attachment element 250. For example forming device 240 can include pinch surfaces 244, 246, and/or 248. Pinch surface 244 can form seals 118 when heated (or the web is sufficiently hot) and pressed against attachment element 250. Pinch surface 246 can form seals 113 when heated (or the web is sufficiently hot) and pressed against attachment element 250. Pinch surface 248 can form seal 115 when heated (or the web is sufficiently hot) and pressed against attachment element 250. According to various embodiments, the chambers remain unsealed, partially sealed, and/or held partially closed during inflation. According to some embodiments, the chambers do not need to be held closed during inflation.

In accordance with various embodiments, the attachment element 250 aids in attaching base ply 107 to formed ply 105. In various embodiments, the attachment element 250 is an opposing surface that is positioned close to or against the forming device 240. The attachment element 250 can apply a pressure against the forming device 240 as the film passes between the two. Additionally or alternatively, the attachment element 250 can apply heat to cause the sealing. Additionally or alternatively, the attachment element 250 can apply an adhesive to cause the sealing. In various embodiments, the attachment element 250 is a cylinder that rolls against or near (forming a nipping device) a cylindrical die of the forming device 240. This compresses and seals the plies there between. This process can form the seals 118, 113, 115, etc., while also forming the protruding structures 137.

In accordance with various embodiments, the attachment element 260 aids in attaching film ply 109 to formed ply 105 by forming seals 155 as discussed according to the embodiments above. In various embodiments, the attachment element 260 includes opposing surfaces 261 and 262 that are positioned close to or against each other. In embodiments in which the cavities 121 are isolated and fluid does not escape, the opposing surfaces may be gapped sufficiently such that they do not destroy the cavities but are sufficient to seal the tertiary ply 109 to the formed ply 105. The attachment element 260 can apply a pressure between surfaces 261 and 262 as the film passes between the two. Additionally or alternatively, the attachment element 260 can apply heat to cause the sealing. Additionally or alternatively, the attachment element 260 can apply an adhesive to cause the sealing. In various embodiments, the attachment element 260 includes two cylinders that rolls against or near (forming a nipping device) one another, forming the sealing surfaces 261 and 262. In various embodiments, the attachment element 260 includes a heating element 263 that directs heat into the plies to seal them together. In some embodiments, the attachment element 260 is a heated drum that heats the ply as it comes into contact therewith.

In accordance with various embodiments, the compressing/deflation element 270 compresses the web 100, removing some or all of the fluid contained therein. As indicated above, fluid is or can be trapped in the web 100 during formation of the protruding structures 137. To compact the web 100 to make handling easier, the web can be compressed forcing the fluid out of the inflation regions 119 and 114. When isolated cavities 121 are formed, the deflation process can be focused at removing fluid from the secondary cavity between ply 105 and 109 so as not to destroy the isolated cavities. In some embodiments, the inflation region 114 and/or 119 can be open regions, meaning there is no end seal or a discontinuous end seal 113 allowing fluid to be dispelled along the length of the web 100. In some embodiments, seal 113 can be subsequently added. For example, secondary element 280 can be a sealing element that applies a longitudinal seal such as 113. In one embodiment, shown in FIG. 6, a pair of compression rollers 171B, 172a are positioned at an angle to the flow of the web 100 through the system. This angle allows the rollers 171B, 172a to compress the chambers and cavities of the film opposite the inflation region 114 and the move toward the inflation region 114 as the film progresses. This aids in limiting the trapping of air by the rollers 171B and 172a. In other embodiments, the compression elements 171C, 172b may be perpendicular to the flow of material, as shown in FIG. 8. FIGS. 7A-8 can be distinguished by the angle of the compression elements relative to the movement of the web through the system. In some embodiments, angled compression elements (see FIG. 7A) may be suitable to remove fluid from webs that have perpendicular chambers relative to the flow of the material through the system 200. This angle relative to the chambers may limit trapping of fluid. In other embodiments, perpendicular compression elements 171C, 172b (see FIG. 8) remove fluid from webs that have angled chambers relative to the flow of the material through the system 200 (see FIG. 4A or 4B). In accordance with various embodiments, the inflatable web supply 290 receives the inflatable web after the first and second opposing deflation elements deflate the web. The web storage stores the web in a substantially uninflated state allowing for transportation of the web in a high-density configuration. After transportation, the web can be re-inflated for used as protective packaging.

According to some embodiments, positioned along one or more of the formed layer 105, base layer 107, and/or tertiary layer 109 is a heat resistive material 505 configured to prevent heat seals from forming between two layers at locations at which the heat resistive material 505 is treated or positioned between the two layers. This enables channels (e.g., channels 125), chambers (e.g., chambers 135), inlets, vents, and other non-sealed formations to remain unsealed after the application of heat to two or more of the layers 105, 107, 109. The heat resistive material 505 can be applied to one or more layers via suitable means such as, for example, through printing, spraying, spreading, or other suitable means. The heat resistive material 505 can be, for example, a glue, and ink, a powder, an adhesive, and/or other suitable form configured to be applied to one or more of the layers 105, 107, 109.

Figure 9:
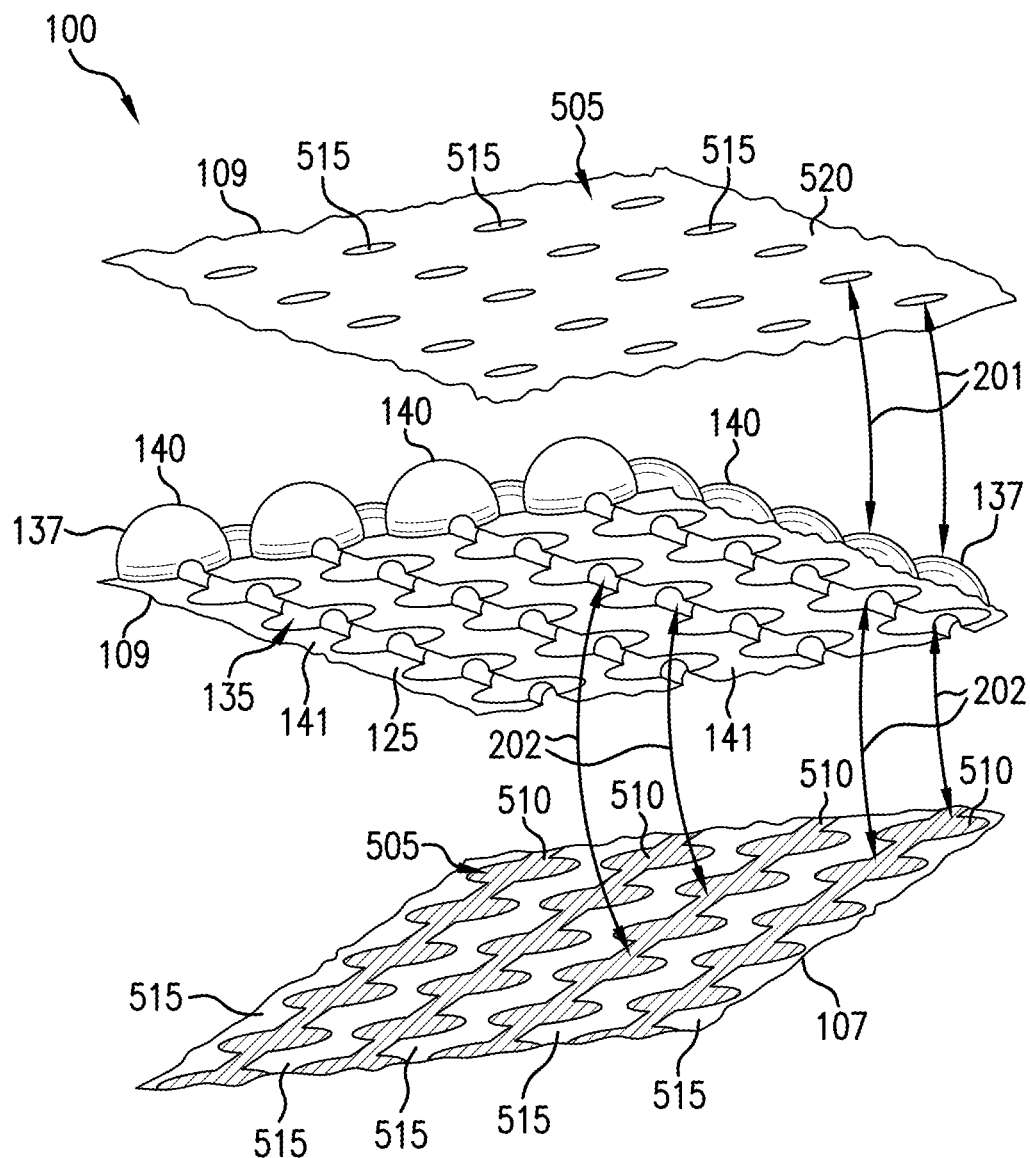
FIG. 9 is an explosive view of an inflatable web with inflatable sub-chambers.

As shown in FIG. 9, the heat resistive material 505 is applied to layer 107 in patterns 510, wherein every location at which the heat resistive material is placed on layer 107, layer 107 will not heat seal to layer 105. On all untreated areas 515 of layer 107 that are not treated with the heat resistive material 505, layer 107 can be heat sealed to another layer (105 or 109) at a location that is not treated with the heat resistive material 505. The heat resistive material 505, as shown in FIG. 9, can be applied to the tertiary layer 109 in a pattern 520 configured to enable the peaks 140 of the protruding structures 137 to seal against the tertiary layer 109 at the untreated areas 515 of the tertiary layer 109. Ply 109 can be applied to ply 105 in direction 201. Ply 107 can be applied to ply 105 in direction 202.

Figure 10:
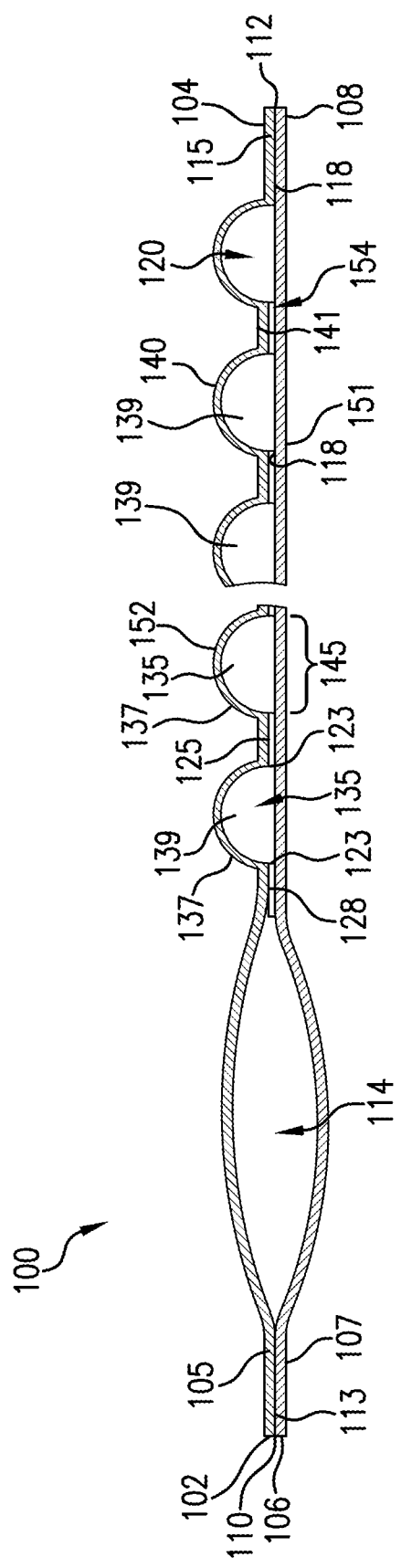
FIG. 10 is a cross-section of the inflatable web having a base ply and a formed ply.

Applying the heat resistive material 505 between the formed layer 105 and the second layer 109 enables the first 105 and second 107 layers to be adhered together with the chambers 135 and channels 125 to be inflated and sealed prior to the application of the tertiary layer 109, as shown in FIG. 10.

Figure 11A:
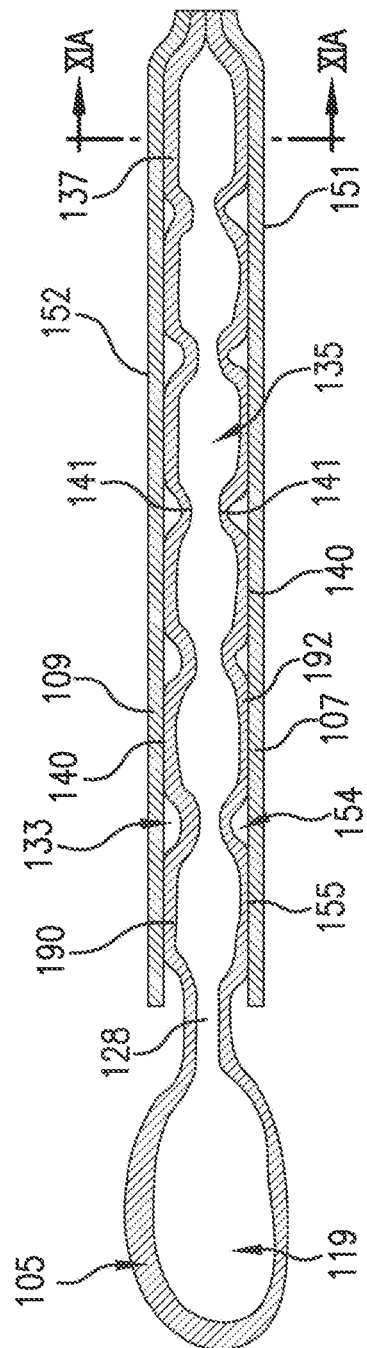
FIG. 11A is a cross-section of the inflatable web having a two-walled inflatable structure.
Figure 11B:
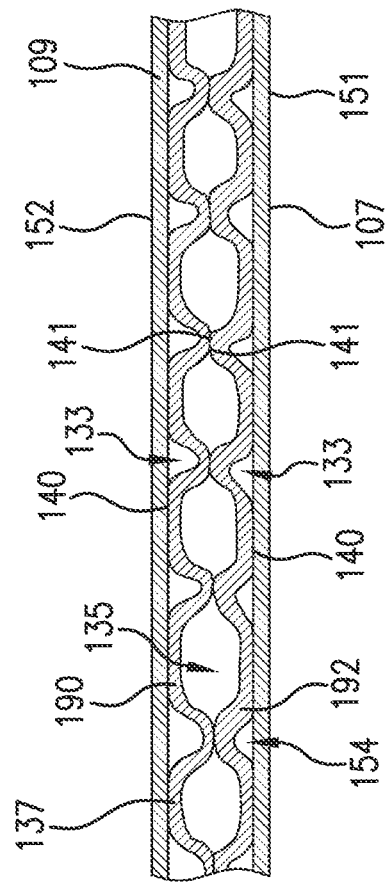
FIG. 11B is a cross-section of the inflatable web of FIG. 11A along cross section line XIB-XIB.

According to various embodiments, the flexible inflatable web 154 includes a plurality of walls, as shown in FIGS. 11A-11B. The plurality of walls may be from a single ply 105 (as shown in FIGS. 11A-11B) or may be from a plurality of plies. As shown in FIGS. 11A-11B, the base ply 107 is adhered to the peaks 140 of the first side 151 of the flexible inflatable web 154, and the tertiary ply 109 is adhered to the peaks 140 of the second side 152 of the flexible inflatable web 154. As the cavities 135 expand with fluid, the base ply 107 conforms to a shape defined by tangents from a plurality of peaks 140 of the first side 151 of the flexible inflatable web 154, and the tertiary ply 109 conforms to a shape defined by tangents from a plurality of peaks 140 of the second side 152 of the flexible inflatable web 154. The pluralities of peak may each or both conform to a 2-dimensional (2D) pattern. According to various embodiments, the outer plies 107 and/or 109 extend along a phantom first tangential surface, bridging the valleys of the a contoured surface of the flexible inflatable web 154, such that when the chambers are inflated the affixed outer ply and the inflatable web cooperatively form a framed structure having significantly elevated bending stiffness compared to a bending stiffness resulting from the inflatable web structure absent the attached outer ply.

Figure 12A:
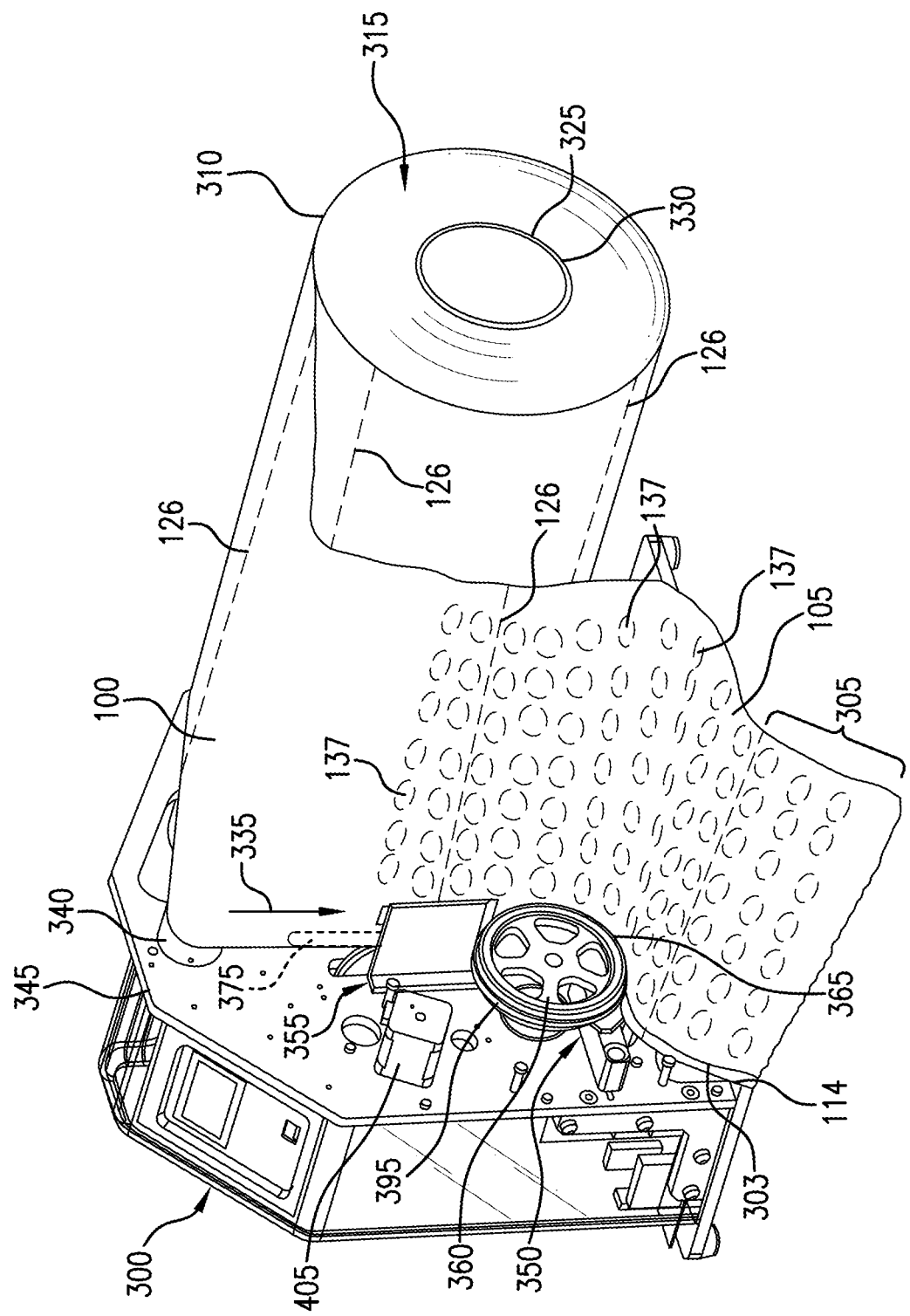
FIG. 12A is an isometric view of an embodiment of an inflation and sealing device with a roll of the web material of FIG. 1A loaded.
Figure 12B:
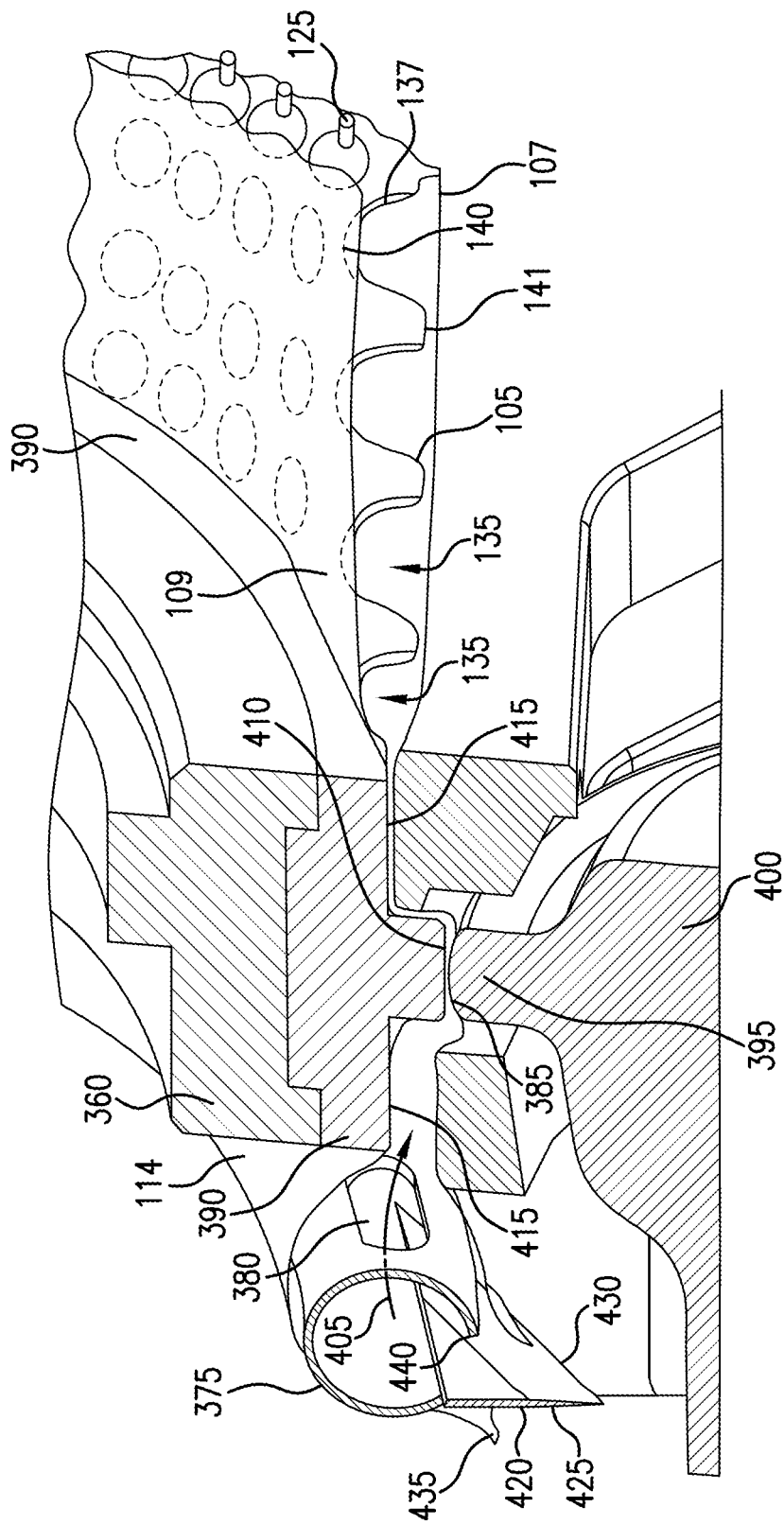
FIG. 12B is a partial isometric section view of an inflation and sealing assembly of the inflation and sealing device of FIG. 12A.

Turning now to FIGS. 12A-12B, an inflation and sealing device 300 (FIG. 12A) having an inflation and sealing assembly 355 (FIG. 12B) for converting the inflatable web 100 into a series of inflated walls or cushions 305 is shown. The uninflated inflatable web 100 can be a bulk quantity supply of uninflated material 310. For example, as shown in FIG. A, the uninflated inflatable web 100 can be provided as a roll 315 of supply material, which can be rolled around an inner support tube 325. In some embodiments, the supply material is rolled into a roll 315 with a hollow center. The support tube 325 or hollow center of the roll 134 of material is supported on a supply support element 330, in this case a roll axle, of the inflation and sealing device 300. The roll axle 330 accommodates the center or tube 325 of the roll of web material 100. In other embodiments, different structures can be used to support the roll of material, such as a tray, fixed spindle or multiple rollers, or a supply material of different configuration (e.g., folded supply material). In some embodiments, the web 100 is delivered from a folded form such as a fanfolded configuration 320 (as shown in FIG. 10).

The inflation and sealing device 300 includes handling elements, with each of the handling elements including web-supporting portions. The web-supporting portions support and direct an inflatable web 100 of material in a longitudinal direction 335 along a path. The handling elements can include a supply support element 330 that supports a supply 310 of the web 100 in an uninflated state. An inflation and sealing assembly 355 is operable to inflate the web 100 with a fluid by directing the fluid between superimposed plies 105, 107 of the web 100 and to seal the plies 105, 107 together to seal the fluid therein. Two of the web-supporting portions (e.g., a roll axle 330 and guide member 340) are arranged relative to a supporting structure 345 and each other such that the supply material 310 experiences a different amount of tension along the transverse direction as it passes from the first to the second web-supporting portion. The relative position of the two web-supporting portions causes a difference in tension in two portions of the web 100 disposed transversely of each other in a substantially same longitudinal location along the path. In further embodiments of the present disclosure, the differential tension can be achieved by providing the guide member 340 with one or more expansion elements as described further below. In some examples, the resulting shape of the guide member 340 can be configured to define a slightly shorter longitudinal travel distance between the first and second adjacent web-supporting portions at one transverse end of the web as compared to the longitudinal travel distance between the first and second adjacent web-supporting portions at another (e.g., opposite) transverse location of the web, as will be further described.

The web material 100 is pulled through the inflation and sealing device 300 by a drive 160. In some embodiments, intermediate members such as a guide member 340 (e.g., which can include a fixed rod, or a roller) can be positioned between the supply 310 and the drive 350. For example, the optional guide member 340 can extend generally perpendicularly from the support structure 345. The guide member 340 can be positioned to guide the web 100 away from the roll 315 of material 100 and along a material path 335 along which the material is processed, also referred to as a longitudinal path. The guide member 340 is arranged between the material support 330, which supports the supply material, and the inflation and sealing assembly 355 components of the inflation and sealing device 300. The guide member 340 can be arranged to route the web material 100 from the supply toward the inflation and sealing assembly 355 such that the web material 100 follows a curved longitudinal path. The guide member 340 can include one or more surfaces, which define web-supporting surfaces (e.g., surfaces extending along the side of the guide member 340 around which the web 100 bends as it traverses the path 335). In some examples, and as described further below, the guide member 340 can include one or more expansion elements. The one or more expansion elements provide at least a portion of the web-supporting surface of the guide member 340 and can configure the guide member 340 to provide variable tension on the web material 100 at different transverse locations of the web material 100.

The guide member 340, or a portion thereof, can be movably coupled to the inflation and sealing device 300, such that the guide member 340, or the movable portion thereof, can move (e.g., spin, translate, oscillate, etc.) in relation to the support structure 345 when the web material 100 is being drawn from the roll 315 by drive the 350. In some examples, the guide member 340 includes a guide roller, which includes an axle or rod portion and a rotatable or roller portion coaxially coupled to the rod portion such that the roller portion spins about a common axis of the rod and roller portions. The roller portion provides a web-supporting surface that supports the web 100, in this case moving with the web 100 as it is being drawn from the roll 315. The moving web-supporting surface can reduce or eliminate sliding friction between the guide member 340 and the web 100. However, in other embodiments, guide members 340 with a fixed web-supporting surface are also envisioned. For example, the guide member can include a rod, similar to the axle, without the rotatable portion. A low friction material, such as polytetrafluoroethylene (PTFE), can be provided (e.g., in the form of a coating or a strip of material adhered to) on at least a portion of the web-supporting surface of a non-rotatable rod, to reduce sliding friction. In yet other embodiments, the non-rotatable portion or rod of the guide member and the rotatable portion (e.g., roller) may not be coextensive. For example, the only rotating portion of the guide member 340 can be the expansion element. Web-supporting surface(s) of the guide member 340 that do not rotate as the web 100 is traveling over the guide member 340 can be coated or otherwise provided with friction-reducing material(s). In some embodiments, the guide member 340 can additionally or alternatively be coupled to the inflation and sealing device 300 such that it moves in a direction normal to the longitudinal path 335 traveled by the supply material.

In the embodiments, a guide member 340 according to the present disclosure includes one or more expansion elements. In some embodiments, the expansion element provides some or all of the web-supporting surface of the guide member 340. A guide member 340, according to the principles of the present disclosure, can thus be configured to control the web material 100, such as to prevent or reduce sagging of the web material 100 between the roll 315 and the inflation nozzle 375 of the inflation and sealing assembly 355 of the inflation and sealing device 300.

In various embodiments, the stock material (e.g. web material 100) can advance downstream from the supply of material, such as the roll 315, without engaging a guide roll 340, but can instead be advanced directly into the inflation and sealing assembly 355. As used herein, the terms upstream and downstream are used relative to the direction of travel of the web material 100. It is appreciated that other suitable structures can be utilized in addition to or as an alternative to use of brakes, guide rollers, or web feed mechanisms in order to guide the web material 100 toward a sealing zone 365 of the sealing assembly 355, which can form part of the sealing assembly 355. The sealing zone 365 can be a pinch zone where the plies 105, 107 of the web material 100 are pinched or compressed and simultaneously heated such that they fuse together. Inflation fluid can also be supplied in the sealing zone 365. As indicated, because the web material 100 can sag, bunch up, drift along the guide roller 340, shift out of alignment with the sealing zone 365, alternate between tense and slack, or become subject to other variations in delivery, the inflation and sealing assembly 355 may need suitable adjustability to compensate for these variations.

The web material 100 is advanced through the inflation and sealing assembly 355 by a drive 350. The inflation and sealing assembly 355 can incorporate the drive 350 or the two systems can operate independently. The drive 350 includes one or more devices operable to motivate the flexible structure 100 through the inflation and sealing device 300. In the embodiment shown, the drive 350 includes a backing element such as backing wheel 360 driven by a motor via a belt. In other embodiments the drive 350 can include a different roller, wheel or drum, or more than one of the same. In other embodiments the backing element 360 can be stationary. In some embodiments the drive 350 can include a belt drive, where the belt is in contact with a portion of the web 100. In some embodiments, multiple belts can be used to motivate the web material 100 through the inflation and sealing device 300. In other embodiments, a belt motivates the web material 100 along the material path, and one or more rollers follow, being driven by the motion of the web material 100. In other embodiments, a combination of belts, rollers, or drums move the web material 100 through the inflation and sealing device 300 along the material path 335. In some embodiments, the various belts, drums, or rollers can be driven by a single motor and be connected with other belts, pulleys, or gears to transfer rotational motion throughout a connected drive. In other embodiments, the belts, drums or rollers can be driven by individual motors or servos.

For example, in various embodiments, the drive 350 includes one or more motor driven rollers operable to drive the flexible material 100 in a downstream direction along a material path 335. One or more of the rollers or drums can be connected to the drive motor such that the one or more rollers drive the system. In accordance with various embodiments, the drive 350 drives the web material 100 without a belt contacting the flexible structure. In another example, the system has a belt that does not contact the web material 100 but instead drives the rollers. In another example, the system has a belt on some drive elements but not others. In another example, the system can have belts interwoven throughout the rollers allowing the material to be driven through the system by the belts.

The inflation and sealing device 300 includes an inflation and sealing assembly 355. Preferably, the inflation and sealing assembly 355 is configured for continuous inflation of the web material 100 as it is unraveled from the roll 315. The roll 315, preferably, comprises a plurality of inflatable chambers 135 that are arranged in series, e.g., in a chain forming a continuous or semi-continuous web. In some embodiments, the web 100 is a singular pad having a sealed end. To begin manufacturing the inflated cushions 305 from the web material 100, the inflation opening 116 of the web material 100 is inserted into an inflation assembly, such as an elongate guide 375 which is inserted into the inflation channel 114 for guiding the web material through the inflation and sealing device 300. The transverse width of the inflation channel 114 can be selected to fit around the nozzle suitably closely to slide over the nozzle 275 and allow fluid to flow into the inflatable chambers 135. In this embodiment, the elongate guide is also an inflation nozzle 375, and is advanced along the material path 335. The nozzle 375 has an elongated portion, which includes one or more of a nozzle base, a flexible portion, and/or a tip. The elongated portion can help guide the flexible structure 100 to a sealing zone 365. At the same time the nozzle 375 can inflate the flexible structure through one or more fluid outlets 380. In this embodiment, the fluid outlets 380 are openings in the nozzle 375. The one or more fluid outlets 380 pass from the inflation channel 114 out of one or more of the nozzle base, the flexible portion, or the tip. The tip includes a terminal portion that can act as a guide to initiate guiding of the nozzle 375 into the inflation channel 114. The terminal portion is a hemispherical plug in the embodiment shown, but other shapes are contemplated. In the embodiment shown in the figures, preferably, the web material 100 is advanced over the inflation nozzle 375 with the inflatable chambers 135 extending transversely with respect to the inflation nozzle 375 and the side outlets 380. The side outlets 380 direct fluid in a transverse direction with respect to a nozzle base into the inflatable chambers 135 to inflate the inflatable chambers 135 as the web material 100 advances along the material path 335 in a longitudinal direction. In other embodiments, the outlets 380 direct fluid in other directions with respect to the nozzle base. The inflation nozzle 375 inserts a fluid, such as pressurized air, into the uninflated web material 100 through nozzle outlets, inflating the material into inflated cushions 305. The inflation nozzle 375 can include a nozzle inflation channel that fluidly connects a fluid source, which enters at a fluid inlet, with the nozzle outlets (e.g., side outlets 380). It is appreciated that in other configurations, the fluid can be other suitable pressured gas, foam, or liquid. The inflated web material 100 is then sealed by the sealing assembly 355 in the sealing zone 365 to form a chain of inflated cushions 305. Typically a nozzle 375 has an outer diameter of about ¼ to ½ of an inch. In this embodiment, the outer diameter of the nozzle is about 3/16 of an inch. Other suitable nozzle diameters can alternatively be selected.

The inflation and sealing assembly 355 includes a heat sealer 385 to form the longitudinal seal 303 in the web material 100 in a sealing zone 365, trapping fluid between the plies 105,107 and thus forming the cushions 305. The heat sealer 385 includes opposing compression elements 390, 395 in compression against each other to compress the overlapping plies 105,107 together in a sealing zone 365. The heat sealer 385 includes a heating element that provides heat energy to the sealing zone 365. The opposing compression elements 390, 395 and the heating element cooperate to produce sufficient compression and heat in the compressed overlapping plies 105,107 in the sealing zone 365 to heat seal the overlapping plies 105,107 together, thereby sealing closed the inflated inflatable chambers 135 and trapping the fluid. Other suitable sealers such as, for example, ultrasonic welders or adhesive sealers can be used.

In the embodiment shown, the compression element 395 is provided as a rotary sealing element 400. The rotary sealing element 400 is positioned such that the compression element 395 contacts one side of the web material 100 (e.g., one of the plies 105, 107) and is opposed to the compression element 390, which contacts an opposite side (e.g. the other of the plies 105, 107) of the web material 100 in the sealing zone 365 to form the longitudinal seal 303 to trap inflation gas in the inflatable chambers 135. According to some embodiments, the rotary sealing element 400 has a relatively narrow convex portion, forming the compression element 395 around its circumference. In FIG. 12B, for convenience, the rotary sealing element 400 is shown partially retracted from the compression element 390 with respect to a sealing position. Certain components of the inflation and sealing device 300 are visible behind the web material 100. Transverse walls extend inwardly from the convex portion toward the rotation axis of the sealing element 400. In this embodiment, the inflation nozzle 375 functions as an air injector by discharging air (or other inflation fluid) along path 405 through the one or more outlets 380 located along the nozzle 375. In other embodiments, an injector separate from the nozzle 375 can be used to inject inflation gas into the inflatable chambers 135. In some embodiments, the sealing element 400 includes a non-stick release coating to prevent sticking of the web material 100 thereon and reduce friction.

According to some embodiments, the heating element is a plug or cartridge-style heater that is electrically powered. The heating element can be electrically heated, for instance, by providing an electrical resistance that converts electrical energy into heat energy. The heating element can be powered by direct current or alternating current, which alternating current can be one phase or three phase power. The heat generated in the heating element conducts, and can convect, heat from the heating element to the rotary sealing element 400 and to the compression element 395.

The heating element can be any material or design suitable to seal together adjacent plies 105,107 together. In various embodiments the heating element can be resistive wire or foil. The wire or foil can be formed of nichrome, iron-chromium-aluminium, cupronickel or other metals suitable for forming and operating a heating element under conditions that are used for sealing plies of the flexible material together allowing the heating element to melt, fuse, join, bind, or unite together the two plies 105,107. In some embodiments, the heating element is formed from about 80% nickel and 20% chromium annealed soft. In other embodiments, the heating element 375 can be a thin-film heater element. The thin-film heating element can be formed of barium titanate and lead titanate composites or other materials suitable for forming and operating the heating element under conditions that allow the heating element to obtain a sufficient heat to seal the plies together.

In the embodiment shown, the sealing element 400 is mounted such that its axis is fixed relative to the support structure 345. In other embodiments it can be mounted such that it is displaceable toward and away from the compression element 390, either manually or by mechanical assistance.

It may be desirable to retract the sealing element 400 away from the web material 100, e.g., when operation of the inflation and sealing device 300 is interrupted so as to prevent burning of the web material 100. For example, the position of the sealing element can be adjusted for increasing or decreasing the pressure between the compression element 395 and the compression element 390. For example, an actuator 405 actuates a cam via a belt. A cam follower rides on the cam to cause the sealing element 400 to be displaced such that a spring is compressed or decompressed to create more or less seal force, between the compression elements 390, 395, respectively. Sealing pressure can be adjusted, for example, to accommodate web materials 100 of different thickness, different materials, or different numbers of plies.

In the embodiment illustrated, the sealing element 400 is freewheeling, e.g., is caused to rotate by the movement of the web material 100 against which the sealing element 400 is pressed. In other embodiments, as an alternative to a freewheeling sealing element 400, a motor can be provided for rotating the sealing element 400 in coordination with the other driving mechanisms.

In some embodiments the sealing element 400 can be made from a metal such as aluminum, steel, brass, bronze; or other suitable material. Thus, the sealing element 400 can have an appreciable thermal mass. For instance, the sealing element 400 can have a sufficient thermal mass maintain a sufficiently consistent temperature to continually seal the plies 105,107 as they travel through the sealing zone 365. A temperature sensor, such as a thermistor or thermocouple, can be supplied to sense and allow control of the temperature of the heat sealer 385. The temperature of the heat sealer 385 can be controlled to about 100-450° C., or preferably to 260-310° C., or more preferably to 280-290° C. In accordance with various embodiments, the heat sealer 385 heats up to between about 150° to 250° C. In some embodiments, the heat sealer 385 reaches about 200° C. The peripheral portions of the heat sealer 385 can reach a lower temperature of between about 50 to 100° C.

As shown in FIG. 12B, the compression element 390 is disposed on a backing wheel 360. The compression element 390 is a resilient member extending around the circumference of the backing wheel 360. The backing wheel 360 is driven by a motor. In other embodiments, the backing wheel 360 can be freewheeling and driven by a drive wheel that frictionally engages the compression element 390. The compression element 390 includes a crown portion 410 to assist in maintaining the web material 100 in a flattened state in the sealing zone 365 as it is fed through the inflation and sealing assembly 355. The crown portion 410 has a raised rectangular profile that extends circumferentially from a shoulder portion 415 of the compression element 390. In other embodiments, the crown portion 410 can have other profiles, such as convex or concave profiles. The crown portion 410 has a larger radius than that of the shoulder portion 415. In the embodiment shown, the compression element 390 includes two shoulder portions 415, with the crown portion 410 disposed transversely between them. In other embodiments, the compression element 390 can have one shoulder portion 415, or can have a flat cross section such that it has no shoulder portions 415 or crown portion 410.

The compression element 390 typically is constructed of a resilient material, e.g., natural rubber or a synthetic rubber such as silicone rubber. The resilient surface conforms in part to the compression element 395, which improves seal quality and increases seal dwell time. when the compression elements 390 and 395 are engaged and pressing against one another, the compression element 395 presses into the crown portion 410, distorting it into a concave profile that matches the convex profile of the compression element 395. Non-limiting examples of compression elements 395 include drums, plates, wheels, boxes, and other surfaces constructed from metal or other rigid material. The backing wheel 360 can have a resilient material applied to one or more of its surfaces to function as a compression element 390. For example, a compression element 390 can be formed by vulcanizing a layer of rubber (e.g., ¼ inch thick) onto an aluminum or steel wheel or other backing element. Alternatively, a compression element 390 can be preconfigured as a resilient band and stretched over a backing element. The thickness of the compression element 390 usually ranges from about ⅛ to about ¼ inch. The resilient material should be selected such that the web material 100 does not unduly stick to the compression element 390. Also, the resilient material should be selected such that it does not degrade under heat. Suitable resilient materials often have a Shore A hardness of from about 20 to about 95 durometer, usually from about 45 to about 75, and more usually from about 50 to about 70. For example, a silicone rubber of 60 durometer may be used.

In other embodiments, the compression element 390 can be a stationary element that does not rotate. The surface of such a compression element 390 can curve along the material path 335. The apex of the curve can be located at approximately the center of a backing element 360, e.g., where the sealing element 400 contacts the web material 100. The curved surface of the backing element 360 effectively lengthens the path of the web material 100, which helps to compensate for dimensional changes in the web material 100 as it is processed. In particular, the length of the web material 100 is decreased somewhat as the inflatable chambers 135 are inflated (due to expansion of the web material 100 in the thickness direction). However, the edge portion of the web material 100 that is sealed by the heat sealer 385 is not inflated, and thus the length of the edge portion is not decreased as the inflatable chambers 135 are inflated. As a result, the edge portion of the web material 100 is prone to gathering as the inflatable chambers 135 are inflated, e.g., in an "accordion" fashion. The curved surface of the backing element 360 increases the length of the material path 335, which assists in maintaining the web material 100 in a flattened state as it is fed through the inflation and sealing assembly 355.

The inflation and sealing device 300 includes a cutting assembly 420 to cut the web material 100. The cutting assembly 420 includes a cutter 425 positioned to cut open the inflation channel 114 from the nozzle 375. The cutter 425 can be include stationary or rotating cutting element. The cutter 425 can be sharp, typically cutting by slicing; abrasive, cutting by abrasion; or another suitable cutting mechanism.

As shown in FIG. 12B, the cutter 425 is a blade with a sharp cutting edge 430 that is sufficiently sharp to cut the web material 100 as it is drawn past the cutting edge 430 along the material path 335. The cutting assembly 420 in this embodiment is positioned to cut the web 100 at a transverse location between the first longitudinal edge 110 and the inlet channel 125 of the inflatable chambers 135, but in alternative embodiments, other positions, such as positions about the inflation nozzle 375, can be employed. The cutter 425 cuts the web material 100 to open the inflation channel 114 of the web material 100 and allow the web to come off the inflation nozzle 375. In various embodiments, the inflation channel 114 of the web 100 can be central to the web 100 or in other locations, and the configuration of the inflation, sealing, and cutting mechanisms are altered accordingly.

The cutter 425 cuts the web material 100 at a cutting location 435 where the cutting edge 430 is adjacent to an exterior if the nozzle 375. At the cutting location 435, the cutting edge 430 faces upstream and severs the web material 100 as it moves along the path 335 past the cutting location 435 so the inflation channel 114 can come off the nozzle 375. In this embodiment, as shown in FIG. 12B, the cutter 425 protrudes into the interior of the nozzle 375 via a cutter receiving aperture 440 formed in the nozzle 375. As shown, the cutter receiving aperture 440 can be provided as a cutter receiving slot.

Figure 13B:
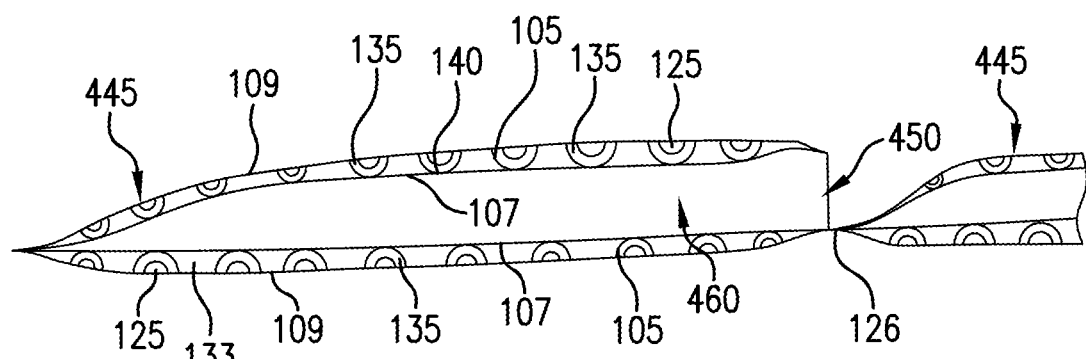
FIG. 13B illustrates a cross-section of the packaging bags of FIG. 13A.
Figure 13C:
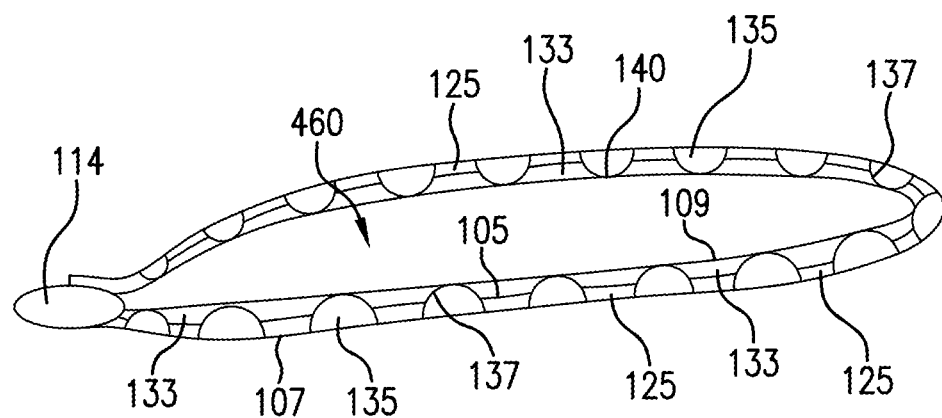
FIG. 13C illustrates a cross-section of the packaging bags of FIG. 13A.

According to various embodiments, the inflatable web 100 may be in a wall or cushion formation 305, as shown in FIGS. 12A-12B, or may be in a pouch or C-fold bag formation 445 (as shown in FIGS. 13A-13C), or other suitable formation.

As shown in FIGS. 13A-13C, a series of packaging bags 445 in a fanfold configuration 320 (FIG. 13A), and a cross-section (FIG. 13B) of a plurality of the packaging bags 445 along the cross-section line XIIIA-XIIIA of FIG. 13A, and a cross-section (FIG. 13C) of a packaging bag 445 along the cross-section line XIIIB-XIIIB of FIG. 13A, are illustratively depicted.

As shown, each of the packaging bags 445 includes an opening 450 into which one or more products/objects can be inserted. The series of packaging bags 445 includes an inflation channel 114 configured to enable air to pass through the packaging back 445 on one side, flow around the C-fold, and reach the other side, inflating both a front and rear side of each of the packaging bags 445. According to an embodiment, each of the packaging bags 445 in the series of packaging bags 445 includes one or more separation regions 126 configured to enable each packaging bag 445 to be separated from an adjacent packaging bag 445.

As described above, the web 100 may be configured as various types of packaging material, including bags. According to the embodiments shown in FIG. 14, a bagging machine 600 may be configured to receive a web 100 of preformed packaging bag formations 445 and be configured to open the opening 450 in each bag formation in order to access the interior cavity 460 of each bag formation 445.

Figure 14:
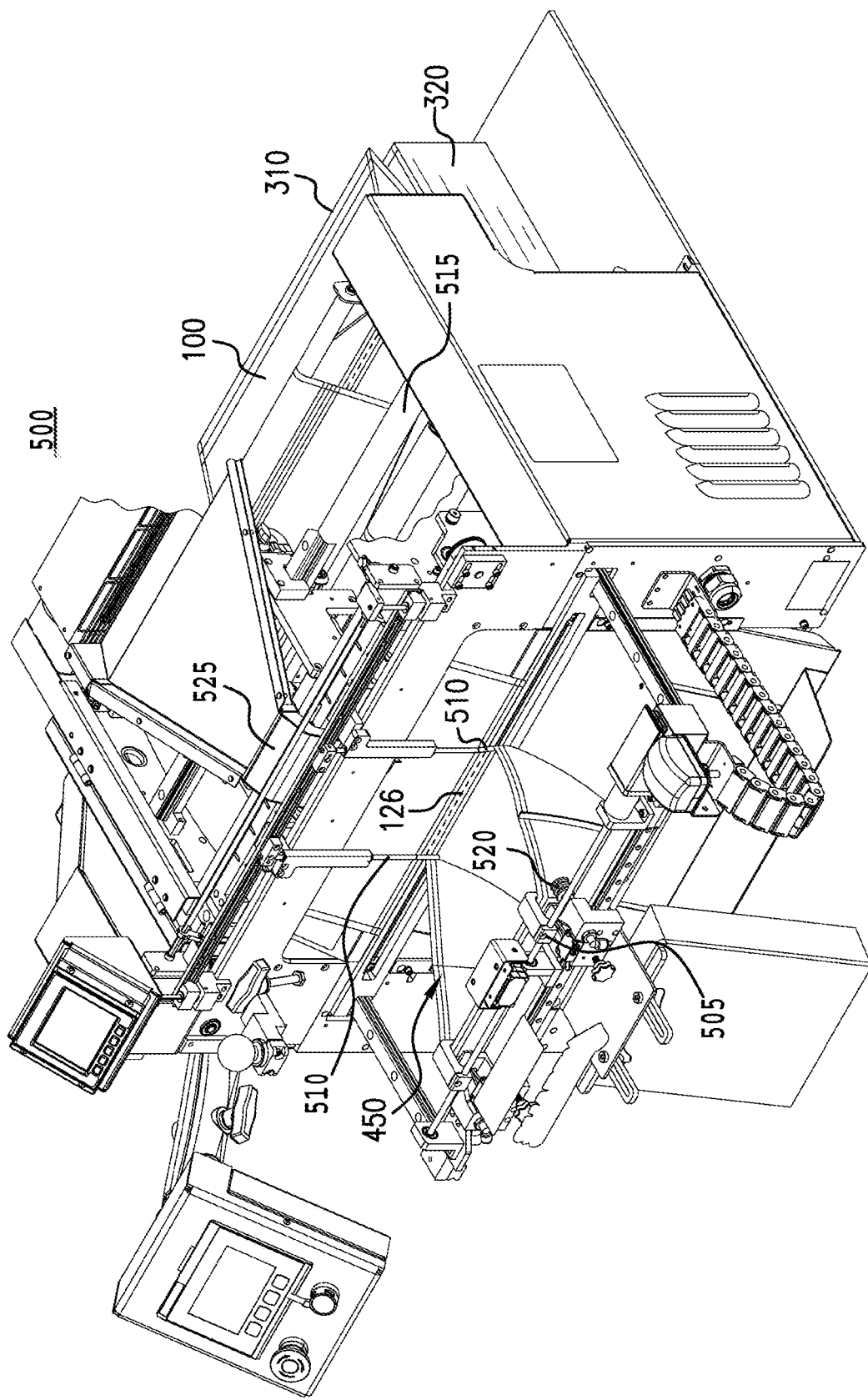
FIG. 14 is a perspective view of an expansion and bagging device.

In the embodiment of FIG. 14, the bagging machine 600 includes a plurality of fingers 605 and/or telescopic projections 610 configured to pull open the bag opening 450, enabling one or more products/objects/etc. to be inserted into the interior cavity 46.

The web 100 is fed into the bagging machine 200 in an unexpanded, high-density configuration. The web 100, at the supply side of the bagging machine 200, may be in a fanfold supply configuration 320 and/or other suitable configuration such as, for example a roll configuration 315 (as shown in FIG. 12A).

The bagging machine 600 includes an expansion device 615. According to various embodiments, the expansion device may be the inflation and sealing device 300, as shown in FIGS. 12A-12B, and/or other suitable systems/apparatuses for expanding/inflating the web 100. The expansion device 615 can include a heating element, heating coil, air compressor, hot air applicator, radiofrequency radiation generator, UV light applicator, chemical reaction applicator, pressure mechanism, or other suitable device for expanding and sealing the web 100 including, but not limited to, an inflation device configured to inject fluid to expand and fill the fluid-chambers 135, 133. The fluid may be air or other suitable fluids. In some embodiments, the expandable element of the web 10 includes one-way valves to retain the fluid in the chamber. For example, in some embodiments, inlets 128 and 146 in FIGS. 1A-6 can be configured to be one-way valves. In other embodiments, inlets 128 and 146 in FIGS. 1A-6 can be configured to be two-way valves. In some embodiments, the inflatable chambers require a longitudinal seal to be applied. In some embodiments, the expansion mechanism 615 is positioned and configured to expand the expandable element prior to inserting a product into the interior cavity 460. In other embodiments, the expansion mechanism 615 is positioned and configured to expand the web 100 subsequent to inserting a product into the interior cavity 460. In yet other embodiments, the expansion mechanism 615 is positioned and configured to expand the web 100 during the inserting of a product into the interior cavity 460.

As shown in FIG. 14, the expansion device 615 is positioned upstream from a bagging mechanism to deliver the web 100 to the bagging mechanism. The bagging mechanism is configured to seal and separate bag formations from subsequent bag formations, forming individual bags.

In other embodiments, the expansion device 615 is positioned at or downstream from the bagging mechanism in order to cause the walls of the web 100 to expand at other points during the bag-making process.

According to some embodiments, the expansion mechanism 615 is configured to expand the web 100 prior to opening the bag opening 450 for insertion of one or more products into the interior cavity 460. In other embodiments, the expansion mechanism 615 is configured to expand the web 100 at the same time as or after opening the bag opening 450 for insertion of one or more products into the interior cavity 460.

The web 100 includes one or more regions of weakness 126 and one or more openings 460, applied prior to the sealing process. In other embodiments, the one or more regions of weakness 126 and/or one or more openings 450 are applied during or after the sealing process. The regions of weakness 126 are configured to be broken in order to separate one packaging container from a subsequent packaging container. The openings 450 are configured and positioned to enable access to the interior cavity 46 of a packaging container formation 445 and may be opened by the mechanical fingers 605 and/or suction cups 620. Pressurized air can be used to aid in opening the opening 450 in the packaging container formations 445.

According to some embodiments, the fingers 605 are configured to pinch a portion of the packaging container opening 450, providing further securing means of opening up the packaging container at the opening 450 and holding the packaging container in place. The bagging machine 600 can include an air blower 625 configured to apply air pressure to the opening 450 to aid in opening the packaging container. The opening 450 can include a pouch seal. The pouch seal can include an adhesive for sealing closed the opening 450 once product is inserted. Other forms of sealing the opening 450, such as heat sealing, can, additionally or alternatively, be implemented. Once the opening 450 is closed and sealed, the regions of weakness 126 can be broken by suitable means such as, for example, reversing the next packaging container, cutting, melting, or other suitable means.

Each packaging container 445 in the web 100 can be separated using a pulling force applied to each packaging container 445, tearing the region of weakness 126 located between each bag in the series of bags, or using one or more cutting edges configured to form a laceration along the seam connecting two packaging containers 445 in the series of packaging containers 44. In some embodiments, each bag in the series of bags is separated using focused heat configured to melt a portion of the seam connecting two packaging containers 445 in the series of packaging containers 445.

In some embodiments, a bagging machine is configured to both convert and seal the web 100 into one or more completed packaging containers. The web 100 is fed into the bagging machine in an expanded or unexpanded configuration and can be in a roll configuration, fanfold configuration, or one or more other suitable configurations.

Once fed into the bagging machine, the web 100 passes through an expansion device such as, for example, expansion mechanism 615, configured to inflate the chambers of the web 100. According to some embodiments, a section of the web 100 is left unexpanded to facilitate folding of the web 100. In some embodiments, lines of the web 100 can be left free of inflatable chambers to form natural hinge lines or regions that are more easily bent than inflated regions. In some embodiments, pressure is applied to the chambers during or subsequent to inflation, forming hinge lines or regions that are more easily bent than other regions.

The expanded web 100 proceeds to be fed through a folding apparatus configured to fold the web 100 such that the longitudinal edges of the web 100 come into contact with each other. The folding apparatus may include one or more folding bars configured to fold the web 100 into a C-fold formation. The folding apparatus may further include a cross-bar or other suitable device configured to align the web 100 such that the folded web 100 forms an interior cavity. Once folded, a series of retaining mechanisms can hold open the web 100, enabling one or more products to be placed into the interior cavity 460 in, for example, a side-loading configuration. The web 100 can, for example, be positioned vertically while the product is placed into the interior cavity 460. In other embodiments, the web can be positioned horizontally or at another suitable angle (e.g., with the opening to the interior cavity 460 facing upwards).

Once the product is placed into the interior cavity 460, the web 100 is fed to a sealing mechanism configured to seal the longitudinal seal and transverse seals of the web 100. The sealing mechanism can be configured to apply heat, pressure, and/or other suitable means of setting the seals. In some embodiments, the sealing mechanism is configured to pull the web through the bagging machine for sealing. Once sealed, the web 100 is converted into a formed and sealed bag. According to some embodiments, the bagging machine includes a separating mechanism configured to separate a bag from the web 100. In some embodiments, the separating mechanism is configured to pull on the completed bag, tearing the completed bag from a subsequent bag along a region of weakness 126. In some embodiments, the separating mechanism is configured to separate the bag via cutting via a blade or heat. In some embodiments, the separating mechanism may incorporate other suitable means of separation. According to some embodiments, the separating mechanism is configured to hold the bag in place to enable the sealing mechanism to seal a subsequent bag.

Examples of components that may be utilized within an inflation and sealing device 300, including without limitation, the nozzle, blower, sealing assembly, and drive mechanisms, and their various components or related systems may be structured, positioned, and operated as disclosed in any of the various embodiments described in the incorporated references such as, for example, U.S. Pat. Nos. 8,061,110; 8,128,770; U.S. Patent Publication No. 2014/0261752; and U.S. Patent Publication No. 2011/0172072 each of which is herein incorporated by reference. Each of the embodiments discussed herein may be incorporated and used with the various sealing devices of the incorporated references and/or other inflation and sealing devices. For example, suitable mechanisms discussed herein and/or in the incorporated references may be used in the inflation and sealing of flexible structure 100.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is also to be understood that the terminology used herein is for describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

As will be understood by one skilled in the art, for any and all purposes, all references to order, (e.g., first, second, third), are only used for identification purposes to aid the reader's understanding of the present invention, and do not create limitations, particularly as to the position, orientation, or use of the invention. Such recitations of order do not limit the scope of disclosure in any way, and elements may be claimed with such references in any order without departing from the present disclosure.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

The invention claimed is:

1. A protective packaging web, comprising:
   a flexible inflatable web that includes inflatable chambers having inlets and configured for receiving a fluid from the inlets and sealing the fluid therein, the inflatable chambers being configured such that, when inflated, the inflatable web structure has a first contoured exterior surface including a plurality of peaks and valleys, with the peaks defining a phantom first tangential surface connecting the plurality of peaks, the inlets further being configured to allow fluid to flow out from the inflatable chambers; and
   a flexible first outer ply affixed to the peaks and detached from the valleys of the first contoured surface, such that when the inflatable chambers are inflated, the first outer ply extends along the phantom first tangential surface, bridging the valleys of the first contoured surface, such that when the chambers are inflated the affixed first outer ply and the inflatable web cooperatively form a framed structure having significantly elevated bending stiffness compared to a bending stiffness resulting from the inflatable web structure absent the attached first outer ply.

2. The protective packaging web of claim 1, wherein the inflatable web structure includes first and second overlayed chamber plies with a seal pattern therebetween that provides the contoured surface when the inflatable chambers are inflated.

3. The protective packaging web of claim 2, wherein the first chamber ply defines the first contoured surface, and the second chamber ply is a second outer ply that cooperates with the first outer ply and first chamber ply to provide the framed structure.

4. The protective packaging web of claim 2, wherein the second surface is configured to define a second contoured exterior surface when the inflatable chambers are inflated on an opposite major side of the inflatable web structure from the first contoured surface.

5. The protective packaging web of claim 4, further comprising a flexible second outer ply affixed to the peaks and detached from the valleys of the first contoured surface including a plurality of peaks and valleys, wherein the plurality of peaks of the second contoured surface define a phantom second tangential surface connecting the plurality of peaks, such that when the inflatable chambers are inflated, the second outer ply extends along the phantom second tangential surface, bridging the valleys of the second contoured surface, thereby cooperatively increasing the bending stiffness of the framed structure.

6. The protective packaging web of claim 1, wherein a distance along the first contoured surface between the peaks thereof to which the first outer ply is affixed is greater than a distance along the first outer ply between the peaks to which the first outer ply is affixed.

7. The protective packaging web of claim 1, wherein the protective packaging web with the inflatable chambers inflated has a plank configuration that is naturally biased to retain a flat configuration with the first and second outer plies extending generally flat.

8. The protective packaging web of claim 1, wherein the peaks include a multitude of peaks arranged in a 2D pattern over the first contoured surface.

9. The protective packaging web of claim 1, wherein:
the inflatable chambers include a plurality of protruding structures, each of the plurality of protruding structures including a base perimeter enclosing an open base region and an extended surface protruding from a plane defined by the flexible inflatable web in a generally flat state, the protruding structures having a larger surface area than the open base region, forming a series of cavities, and
each of the plurality of protruding structures includes an inflation port allowing each of the plurality of cavities to be inflated via the inflation port.

10. The protective packaging web of claim 9, wherein the surface of the protruding structures is formed at least in part by a plastically stretched portion of the flexible inflatable web.

11. The protective packaging web of claim 1, wherein each of the inflatable chambers extends along the flexible inflatable web at a non-perpendicular angle to a longitudinal edge of the flexible inflatable web.

12. The protective packaging web of claim 1, wherein the flexible inflatable web and the flexible first outer ply form secondary inflatable chambers therebetween having inlets and configured to receiving a fluid from the inlet and sealing the fluid therein.

13. The protective packaging web of claim 12, further comprising one or more venting components between the flexible inflatable web and the flexible first outer ply configured to enable fluid to be removed from the one or more secondary inflatable chambers.

14. The protective packaging web of claim 1, wherein the flexible first outer ply extends along a length of the flexible inflatable web.

15. The protective packaging web of claim 1, further comprising an inflation region connecting to the inlets, the inflation region forming a fluid path formed within the flexible inflatable web,
wherein the inlets allow fluid to flow out of the inflatable chambers into the inflation region and back into the inflatable chambers such that the inflatable chambers can be collapsed to a substantially uninflated state and subsequently returned to an inflated state.

16. The protective packaging web of claim 15, wherein the inflatable chambers include a longitudinal seal adjacent thereto such that the longitudinal seal closes off the inlets, preventing the inflatable chambers from being inflated or deflated.

17. The protective packaging web of claim 1, wherein the flexible first outer ply is affixed to the flexible inflatable web via heat seals.

18. The protective packaging web of claim 17, further comprising a heat resistive material affixed to one or more of the flexible first outer ply and the flexible inflatable web, wherein the heat resistive material prevents the first outer ply to be heat sealed to the flexible inflatable web at locations at which the heat resistive material is positioned between the flexible first outer ply and the flexible inflatable web.

19. A method for forming an inflatable web, comprising:
providing a flexible inflatable web that includes inflatable chambers having inlets and configured for receiving a fluid from the inlet and sealing the fluid therein, the inflatable chambers being inflated, and the inflatable web structure having a first contoured exterior surface including a plurality of peaks and valleys, with the peaks defining a phantom first tangential surface connecting the plurality of peaks; and
affixing a flexible first outer ply to the peaks of the first contoured surface while the inflatable chambers are inflated and the inlets are yet unsealed, such that the first outer ply is detached from the valleys and the first outer ply extends along the phantom first tangential surface, bridging the valleys of the first contoured surface, such that when the chambers are inflated the affixed first outer ply and the inflatable web cooperatively form a framed structure having significantly elevated bending stiffness compared to a bending stiffness resulting from the inflatable web structure absent the attached first outer ply.

20. The method of claim 19, further comprising holding the inlets at least partially closed to retain the fluid in the inflated chambers, wherein the first flexible ply is affixed to the peaks while the inlets are held closed.

21. The method of claim 20, wherein the inlets are held closed by pinching.

22. The method of claim 19, wherein the flexible outer ply is affixed to the peaks by heat sealing.

23. The method of claim 22, further comprising applying a heat resistive material to one or more of the flexible first outer ply and the flexible inflatable web, wherein the heat resistive material prevents the first outer ply to be heat sealed to the flexible inflatable web at locations at which the heat resistive material is positioned between the flexible first outer ply and the flexible inflatable web.

24. The method of claim 19, wherein the contoured surface is formed at least in part by a plastically stretched portion of the first film ply.

* * * * *